(12) United States Patent
Agiwal et al.

(10) Patent No.: US 8,908,717 B2
(45) Date of Patent: Dec. 9, 2014

(54) METHOD AND SYSTEM OF TRANSMITTING AND RECEIVING FRAGMENTABLE DATA UNITS IN A WIRELESS COMMUNICATION ENVIRONMENT

(75) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 13/493,852

(22) Filed: Jun. 11, 2012

(65) Prior Publication Data

US 2012/0314719 A1    Dec. 13, 2012

(30) Foreign Application Priority Data

Jun. 10, 2011  (IN) ............................ 1973/CHE/2011

(51) Int. Cl.
*H04J 3/24* (2006.01)
*H04W 80/02* (2009.01)

(52) U.S. Cl.
CPC ............. *H04L 28/065* (2013.01); *H04W 80/02* (2013.01)
USPC ............................ 370/474; 370/389; 370/312

(58) Field of Classification Search
CPC ...... H04L 12/42; H04L 43/0817; H04L 43/10
USPC .......... 370/312, 389, 390, 474, 478, 475, 476
See application file for complete search history.

(56) References Cited

U.S. PATENT DOCUMENTS

| | | | | |
|---|---|---|---|---|
| 6,377,782 | B1 * | 4/2002 | Bishop et al. | 455/3.01 |
| 7,475,323 | B2 * | 1/2009 | Hang et al. | 714/758 |
| 7,489,629 | B2 * | 2/2009 | Ye et al. | 370/230 |
| 8,335,184 | B2 * | 12/2012 | Okuda | 370/329 |
| 2008/0037474 | A1 * | 2/2008 | Niwano | 370/335 |
| 2008/0101290 | A1 | 5/2008 | Sung et al. | |
| 2008/0219159 | A1 * | 9/2008 | Chateau et al. | 370/230 |
| 2009/0168710 | A1 | 7/2009 | Thakare | |
| 2011/0080873 | A1 | 4/2011 | Zhang et al. | |
| 2012/0106413 | A1 | 5/2012 | Huang et al. | |

FOREIGN PATENT DOCUMENTS

| | | |
|---|---|---|
| WO | WO 2007/039023 A1 | 4/2007 |
| WO | WO 2007/078156 A2 | 7/2007 |
| WO | WO 2010/121410 A1 | 10/2010 |
| WO | WO 2011/028038 A2 | 3/2011 |
| WO | WO 2011/062425 A2 | 5/2011 |

OTHER PUBLICATIONS

International Search Report dated Dec. 6, 2012 in connection with International Patent Application No. PCT/KR2012/004608.
Written Opinion of International Searching Authority in connection with International Patent Application No. PCT/KR2012/004608.
Extended European Search Report dated Oct. 9, 2014 in connection with European Application No. 12796033.4, 8 pages.

* cited by examiner

*Primary Examiner* — Phuc Tran

(57) ABSTRACT

The present invention provides a method and system for transmitting and receiving Fragmentable Data Units (FDUs) in a wireless communication environment. In one embodiment, a method of transmitting FDUs in a wireless communication environment includes fragmenting a FDU into a fixed number of fragments by a transmitting device. The method further includes packing the fragments of said FDU in payloads of Medium Access Control (MAC) Protocol Data Units (PDUs). Additionally, the method includes encoding control information of each fragment of said FDU in a fragmentation control (FC) field and a sequence number field of the respective MAC PDU. Moreover, the method includes transmitting the MAC PDUs containing the fragments of said FDU and control information associated with the fragments to a receiving device.

51 Claims, 26 Drawing Sheets

| CONTROL INFORMATION | DESCRIPTION |
|---|---|
| ALL ZEROS (IN BINARY) | UNFRAGMENTED FDU(S) |
| 1 TO $2^N-1$ (IN BINARY) | INDICATES $X^{TH}$ FRAGMENT, WHERE X RANGES FROM 1 TO $2^N-1$ |

400

| 'N-1' MSBS (IN DECIMAL) | LSB OF FC (IN DECIMAL) | DEFINITION |
|---|---|---|
| 0 | 1 | UNFRAGMENTED FDU |
| 0 | 0 | 1ST FRAGMENT OF FDU |
| 1 | 0 OR 1 | 2ND FRAGMENT OF FDU |
| 2 | 0 OR 1 | 3RD FRAGMENT OF FDU |
| 3 | 0 OR 1 | 4TH FRAGMENT OF FDU |
| ... | ... | ... |
| X | 0 OR 1 | $X^{TH}$ FRAGMENT OF FDU |
| ... | ... | ... |
| $2^{(N-1)}-1$ | ALWAYS 1 | $2^{(N-1)TH}$ FRAGMENT OF FDU |

METHOD AND SYSTEM OF TRANSMITTING AND RECEIVING FRAGMENTABLE DATA UNITS IN A WIRELESS COMMUNICATION ENVIRONMENT

CROSS-REFERENCE TO RELATED APPLICATION(S) AND CLAIM OF PRIORITY

The present application is related to and claims priority under 35 U.S.C. §119(a) to an application entitled "SYSTEM AND METHOD OF FRAGMENTING PACKET DATA IN A WIRELESS COMMUNICATION NETWORK" filed in India on $10^{th}$ Jun. 2011 and assigned Serial No. 1973/CHE/2011 and to an application filed in India on Jun. 8, 2012 and assigned Serial No. 1973/CHE/2011, the contents of which are hereby incorporated by reference.

TECHNICAL FIELD OF THE INVENTION

The present invention generally relates to the field of wireless communication, and more particularly relates transmitting and receiving fragmentable data units in a wireless communication network.

BACKGROUND OF THE INVENTION

Broadband wireless networks based on various standards (e.g., Institute of Electronic and Electric Engineers (IEEE) 802.16 based WiMAX standard and its evolution to IEEE 802.16m provides various types of services such as voice, packet data and so on. In order to provide these kinds of services, control information and data packets needs to be exchanged between a transmitting device and a receiving device. In downlink scenario, the transmitting device may include a base station and the receiving device may include a mobile station. In uplink scenario, the transmitting device may include a mobile station and the receiving device may include a base station.

Typically, service data is generated by various applications running at the transmitting device for providing various types of services. The service data is then exchanged between the transmitting device and the receiving device upon establishing a connection. Generally, the connection is identified by a connection identifier.

Multiple connections may exist between the transmitting device and the receiving device to carry service user data belonging to multiple applications running at the transmitting device and the receiving device. On the contrary, a single connection may also be used to carry the service user data belonging to multiple applications running at the transmitting device and the receiving device. Each connection carries variable size MAC Service Data Units (SDUs) received from various applications and contains service user data.

Typically, a MAC layer in the transmitting device receives MAC SDUs from upper layer protocol. The MAC layer may fragments the MAC SDUs depending on size of MAC SDUs and resources available for transmitting MAC PDUs. In case of ARQ connection is enabled, ARQ protocol in the MAC layer generates ARQ blocks from MAC SDUs and/or MAC SDU fragments and assigns unique sequence number to each of the generated ARQ blocks. The ARQ blocks are packed in payload of MAC Protocol Data Units (PDUs) and the MAC PDUs are transmitted to a receiving device. Generally, the receiving device feedbacks status of reception of ARQ blocks to the transmitting device. Based on the status, the ARQ protocol fragments the ARQ blocks depending on size of ARQ blocks and resources for retransmission, and retransmits the fragmented ARQ blocks to the receiver.

Generally, two levels of fragmentation and reassembly processing is performed at the transmitting device and the receiving device as given below:

Fragmentation of MAC SDUs during initial transmission and fragmentation of ARQ block containing the MAC SDUs and/or MAC SDU fragments during retransmission; and Reassembly of the fragmented ARQ block from the payload received in the MAC PDU and reassembly of the MAC SDUs from the received ARQ block.

The above processing functions significantly increase complexity at the transmitting device and the receiving device, thereby affecting performance throughput.

Also, during retransmission, the ARQ protocol divides each ARQ block into fixed size ARQ sub-blocks based on size of ARQ sub-blocks and assigns a sub-sequence number to each of the ARQ sub-blocks. This requires adding multiple headers in MAC PDUs during initial transmission and retransmission, thereby affecting throughput at the transmitting device and the receiving device.

SUMMARY OF THE INVENTION

In accordance with an aspect of the present invention, there is provided a method for transmitting fragmentable data unit (FDU) in a wireless communication environment, the method includes fragmenting a FDU into a fixed number of fragments by a transmitting device; packing the fragments of said FDU in payloads of Medium Access Control (MAC) Protocol Data Units (PDUs); encoding control information associated with each of the fragments in a fragmentation control (FC) field and a sequence number (SN) field of the respective MAC PDUs, wherein the control information encoded in the FC field indicates position of said each of the fragments with respect to other fragments of said FDU, and wherein the control information encoded in the SN field identifies the said FDU to which said each of the fragments belongs; and transmitting the MAC PDUs containing the fragments of said FDU and the control information associated with each of the fragments to a receiving device.

In accordance with another aspect of the present invention, there is provided a transmitting device, the transmitting device includes a processor; and memory coupled to the processor, wherein the memory includes a fragmentation module configured for: fragmenting a I-DU into a fixed number of fragments; packing the fragments of said FDU in payloads of Medium Access Control (MAC) Protocol Data Units (PDUs); encoding control information associated with each of the fragments in a fragmentation control (FC) field and a sequence number (SN) field of the respective MAC PDUs, wherein the control information encoded in the FC field indicates position of said each of the fragments with respect to other fragments of said FDU, and wherein the control information encoded in the SN field identifies the said FDU to which said each of the fragments belongs; and transmitting the MAC PDUs containing the fragments of said FDU and the control information associated with each of the fragments to a receiving device.

In accordance with an aspect of the present invention, there is provided a method for forming a fragmentable data unit (FDU) from fragments of the 1-DU received from a transmitting device, the method includes receiving Medium Access Control (MAC) Protocol Data Units (PDUs) containing fragments of said FDU and control information associated with the fragments from a transmitting device, wherein the control information in a Fragmentation Control (FC) field of the respective MAC PDUs indicates position of each of the fragments with respect to other fragments of said FDU, and wherein the control information in a Sequence Number (SN) field of the respective MAC PDUs identifies the said FDU to which the fragment belongs; and determining whether a fixed number of fragments are received from the transmitting device based on the control information associated with each of the received fragments; and generating said FDU from the fixed number of fragments received in the MAC PDUs using the control information associated with each of the received fragments.

In accordance with another aspect of the present invention, there is provided a receiving device, the receiving device includes a processor; and memory coupled to the processor, wherein the memory includes a reassembly module configured for: receiving Medium Access Control (MAC) Protocol Data Units (PDUs) containing fragments of said FDU and control information associated with the fragments from a transmitting device, wherein the control information in a Fragmentation Control (FC) field of the respective MAC PDUs indicates position of each of the fragments with respect to other fragments of said FDU, and wherein the control information in a Sequence Number (SN) field of the respective MAC PDUs identifies the said FDU to which the fragment belongs; and determining whether a fixed number of fragments are received from the transmitting device based on the control information associated with each of the received fragments; and generating said FDU from the fixed number of fragments received in the MAC PDUs using the control information associated with each of the received fragments.

In accordance with an aspect of the present invention, there is provided a method for transmitting fragmentable data unit (FDU) in a wireless communication environment, the method includes fragmenting a FDU into two or more fragments by a transmitting device, wherein total number of fragments is equal to or less than a threshold value; packing the fragments of said FDU in payloads of Medium Access Control (MAC) Protocol Data Units (PDUs); encoding control information associated with each of the fragments in a fragmentation control (FC) field and a sequence number (SN) field of the respective MAC PDUs, wherein the control information encoded in the FC field indicates position of said each of the fragments with respect to other fragments of said FDU, and wherein the control information encoded in the SN field identifies the said FDU to which said each of the fragments belongs; and transmitting the MAC PDUs containing the fragments of said FDU and the control information associated with each of the fragments to a receiving device.

In accordance with another aspect of the present invention, there is provided a transmitting device, the transmitting device includes a processor; and memory coupled to the processor, wherein the memory includes a fragmentation module configured for: fragmenting a FDU into two or more fragments, wherein total number of fragments is equal to or less than a threshold value; packing the fragments of said FDU in payloads of Medium Access Control (MAC) Protocol Data Units (PDUs); encoding control information associated with each of the fragments in a fragmentation control (FC) field and a sequence number (SN) field of the respective MAC PDUs, wherein the control information encoded in the FC field indicates position of said each of the fragments with respect to other fragments of said FDU, and wherein the control information encoded in the SN field identifies the said FDU to which said each of the fragments belongs; and transmitting the MAC PDUs containing the fragments of said FDU and the control information associated with each of the fragments to a receiving device.

In accordance with an aspect of the present invention, there is provided a method for forming a fragmentable data unit (FDU) from fragments of the FDU received from a transmitting device, the method includes receiving Medium Access Control (MAC) Protocol Data Units (PDUs) containing fragments of said FDU and control information associated with the fragments from a transmitting device, wherein the control information in a Fragmentation Control (FC) field of the respective MAC PDUs indicates position of each of the fragments with respect to other fragments of said FDU, and wherein the control information in a Sequence Number (SN) field of the respective MAC PDUs identifies the said EDU to which the fragment belongs; and determining whether entire set of fragments of said FDU are received from the transmitting device based on the control information associated with each of the received fragments; and generating said FDU from the entire set of fragments received in the MAC PDUs using control information associated with each of the received fragments.

In accordance with another aspect of the present invention, there is provided a receiving device, the receiving device includes a processor; and memory coupled to the processor, wherein the memory includes a reassembly module configured for: receiving Medium Access Control (MAC) Protocol Data Units (PDUs) containing fragments of said FDU and control information associated with the fragments from a transmitting device, wherein the control information in a Fragmentation Control (FC) field of the respective MAC PDUs indicates position of each of the fragments with respect to other fragments of said FDU, and wherein the control information in a Sequence Number (SN) field of the respective MAC PDUs identifies the said FDU to which the fragment belongs; and determining whether entire set of fragments of said FDU are received from the transmitting device based on the control information associated with each of the received fragments; and generating said FDU from the entire set of fragments received in the MAC PDUs using control information associated with each of the received fragments.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16 is a tabular representation of control information encoded in a fragmentation control field of a MAC PDU to indicate order of fragments of the FDU, according to another embodiment;

The drawings described herein are for illustration purposes only and are not intended to limit the scope of the present disclosure in any way.

DETAILED DESCRIPTION OF THE EXEMPLARY EMBODIMENT

The present invention provides a method and system for transmitting and receiving fragmentable data units (FDUs) in wireless communication environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
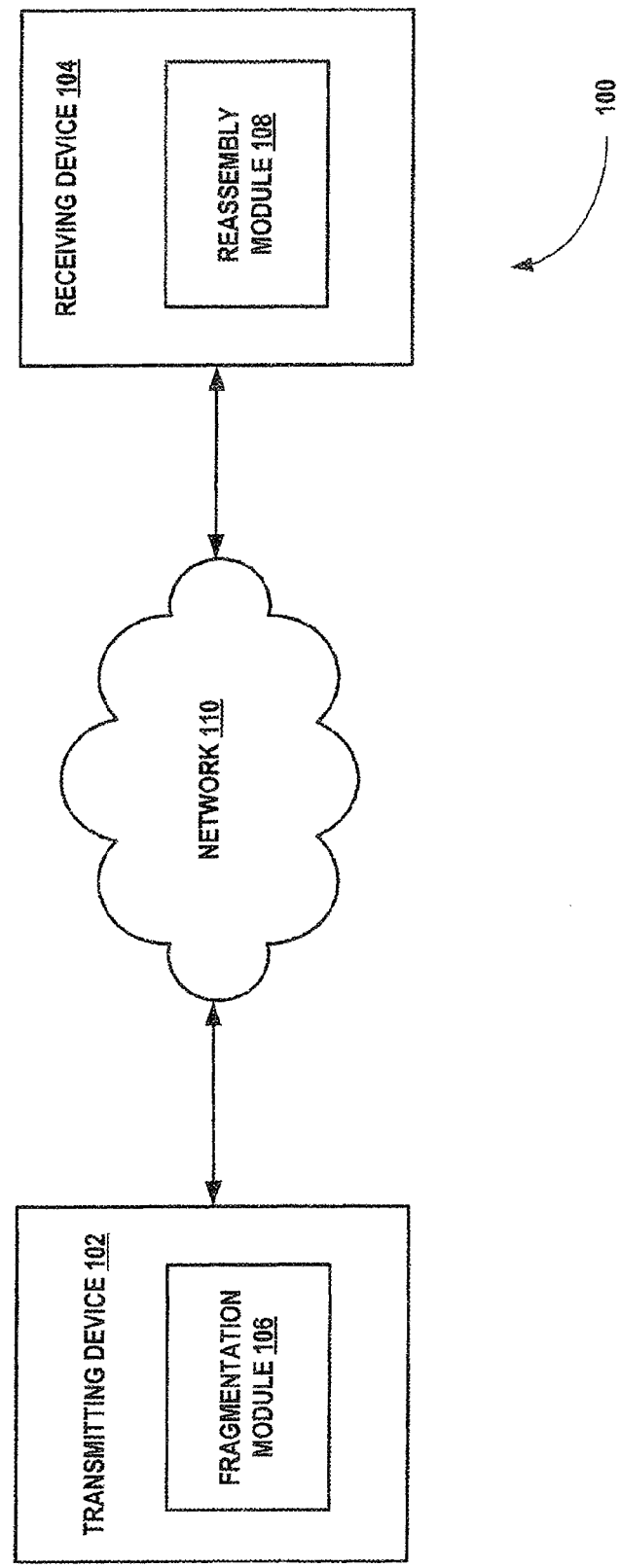
FIG. 1 illustrates a block diagram of an exemplary wireless communication system, according to one embodiment.

FIG. 1 illustrates a block diagram of an exemplary wireless communication system 100, according to one embodiment. In FIG. 1, the wireless communication system 100 includes a transmitting device 102 having a fragmentation module 106, a receiving device 104 having a reassembly module 108 and a wireless network 110 communicatively connecting the transmitting device 102 and the receiving device 104. For example, the transmitting device 102 may be a base station or user equipment such as mobile phone. Also, the receiving device 104 may be user equipment such as a mobile phone or a base station.

In a wireless communication environment such as shown in FIG. 1, the transmitting device 102 transmits Medium Access Control (MAC) Protocol Data Units (PDUs) containing, either fragmented/unfragmented Automatic Repeat Request (ARQ) block(s) for an ARQ connection or fragmented/unfragmented MAC Service Data Units (SDUs) for a non-ARQ connection to the receiving device 104. In case, the MAC PDUs carries the fragmented/unfragmented ARQ block(s), the ARQ block(s) contains one or more unfragmented MAC SDUs. In both the cases, the MAC SDUs contains service data which is processed by the receiving device 104 when the MAC PDUs are received at the receiving device 104. In the following description, the terms 'ARQ block' and 'MAC SDU' is commonly referred to as Fragmentable Data Unit (FDU). It is understood that the term FDU is not limited to ARQ block or MAC SDU but includes any data entity which can be fragmented and packed in a MAC PDU.

According to the present invention, the fragmentation module 106 in the transmitting device 102 receives FDUs from upper protocol layers for packing the FDUs in one or more MAC PDUs and transmitting the MAC PDUs to the receiving device 104. In such case, the fragmentation module 106 fragments the FDU into a number of fragments and packs fragments in payload of different MAC PDUs. In one embodiment, the FDU is fragmented into a fixed number of fragments which is equal to $2^n-1$. In another embodiment, the number of fragments formed from the FDU is equal to maximum of $2^n-1$. In yet another embodiment, the number of fragments formed from the FDU is equal to $2^{n-1}$. It can be noted that, 'n' is equal to number of bits used to represent a fragmentation control (FC) field in a MAC header of a MAC PDU. The fragmentation module 106 also encodes control information in the MAC header of the respective MAC PDUs. The control information may include position of the fragment with respect to other fragments of the FDU and sequence number associated with the FDU to which the fragment belongs. The transmitting device 102 then transmits the MAC PDUs containing the fragments of the FDU and associated control information to the receiving device 104 over wireless network 110.

The reassembly module 108 in the receiving device 104 receives MAC PDUs containing the fragments of the FDU and the associated control information. The reassembly module 108 then decodes the control information from the MAC header of each MAC PDUs and determines number of fragments of the FDU based on the decoded control information. Accordingly, the reassembly module 108 forms the FDU from the fragments received in the payload of the MAC PDUs. In case of ARQ enabled connection if the reassembly module 108 fails to receive one or more fragments of the transmitting device 102, the reassembly module 108 notifies the transmitting device 102 regarding the failure to receive the one or more fragments. In such case, the transmitting device 102 re-transmits fragments of the FDU in MAC PDUs to the receiving device 104.

Figure 2:
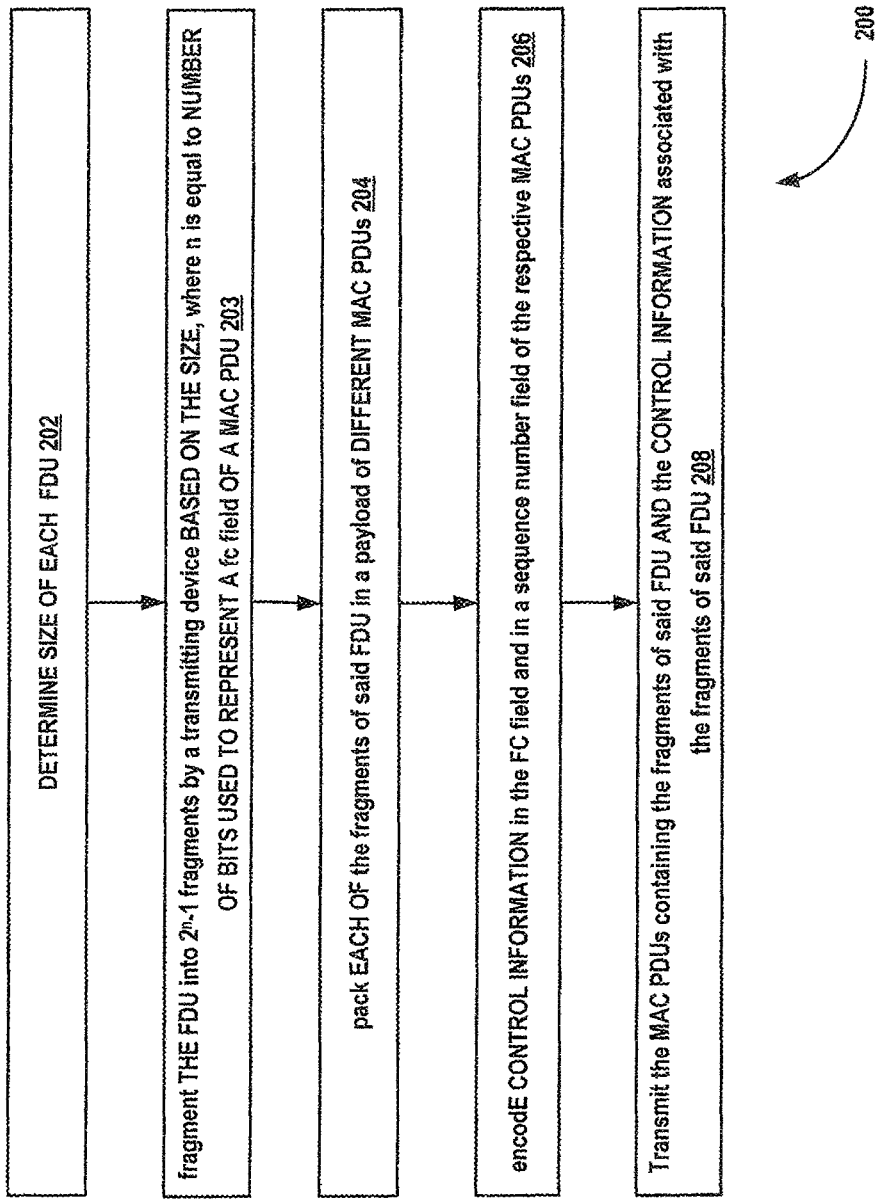
FIG. 2 is a process flowchart illustrating an exemplary method of transmitting fragmentable data units (FDUs) in a wireless network environment, according to one embodiment.

FIG. 2 is a process flowchart 200 illustrating an exemplary method of transmitting fragmentable data units in the wireless network environment 100, according to one embodiment. When FDUs are received from upper protocol layers, size of each FDU is determined by the fragmentation module 106, at step 202. At step 202, each FDU is fragmented into fixed ($2^n-1$) number of fragments by the fragmentation module 106. It is appreciated that, the sum of sizes of fragments formed from the FDU is equal to total size of FDU. The value of 'n' is equal to the number of bits used to represent a size of Fragmentation Control (FC) field in a Medium Access Control (MAC) header of a MAC Protocol Data Unit (PDU). It can be noted that, size of the fragments of the FDU may be same or different; however the total size of the fragments is equal to size of entire FDU.

Figure 4:
FIG. 4 is a tabular representation of control info iation encoded in a fragmentation control field of a MAC PDU to indicate order of fragments of the FDU, according to one embodiment

At step 204, each of the fragments of the FDU are packed in a payload of different MAC PDUs. At step 206, control information associated with each fragment is encoded in the FC field and an SN field of the respective MAC PDUs. The control information encoded in the FC field indicates position of the respective fragment with respect to other fragments of the FDU. Exemplary control information encoded in the FC field is illustrated in FIG. 4. Referring to FIG. 4, the control information equal to zeros indicates that one or more unfragmented FDUs are packed in the payload of the MAC PDU. If the FC field contains a non-zero value X, then it implies that the payload contains $X^{th}$ fragment of the FDU, where X is an integer ranging from 1 to $2^n-1$. For example, if the FC field contains value equal to '1', then it implies that the payload contains the first fragment of the FDU. If the FC field contains value equal to $2^n-1$, then it implies that the payload contains the last fragment of the FDU.

The control information encoded in the SN field helps identify the FDU to which said each fragment belongs. In one exemplary implementation, the control information encoded in the SN field includes sequence number associated with the FDU to which said each fragment belongs. Additionally, length information is encoded in a length field of the MAC header to indicate the length of the MAC PDU. At step 208, the MAC PDUs containing fragments of the FDU and the associated control information is transmitted to the receiving device 104.

Figure 3:
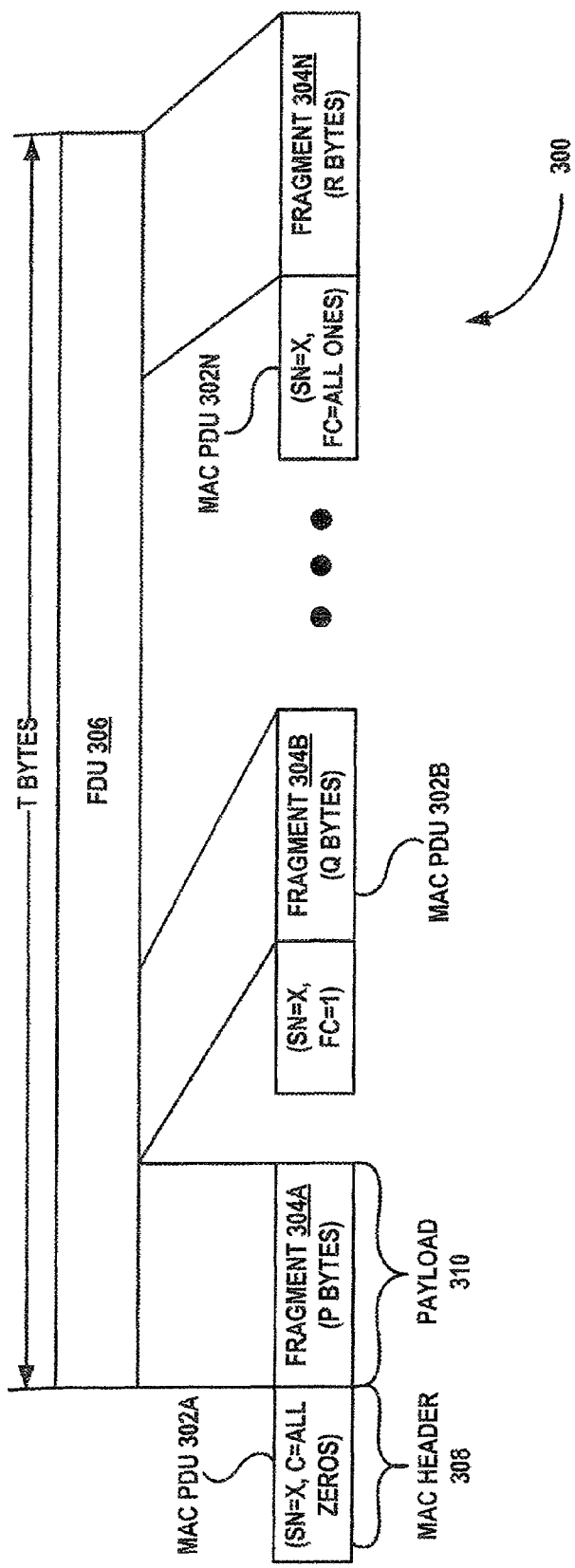
FIG. 3 is a schematic representation depicting Medium Access Control (MAC) Protocol Data Units (PDUs) carrying fragments of a FDU and associated control information.

FIG. 3 is a schematic representation 300 depicting MAC PDUs 302A-N carrying fragments 304A-N of a FDU 306 and associated control information. Each of the MAC PDUs 302A-N contains a MAC header 308 and a payload 310. Upon fragmenting the FDU 306, the fragments 304A-N is packed in the payload 310 of the respective MAC PDUs 302A-N and the control information corresponding to each of the fragments 304A-N is encoded in the MAC header 308 of the respective MAC PDUs 302A-N. As described above, control information indicating position of respective fragments 304A-N is encoded in the FC field of the MAC header 308 and control information identifying the FDU 306 associated with the respective fragments 304A-N is encoded in the SN field of the MAC header 308. As can be seen, the total size of the fragments 304A-N packed in the MAC PDUs 302A-N is equal to the size of the FDU 306.

Figure 5:
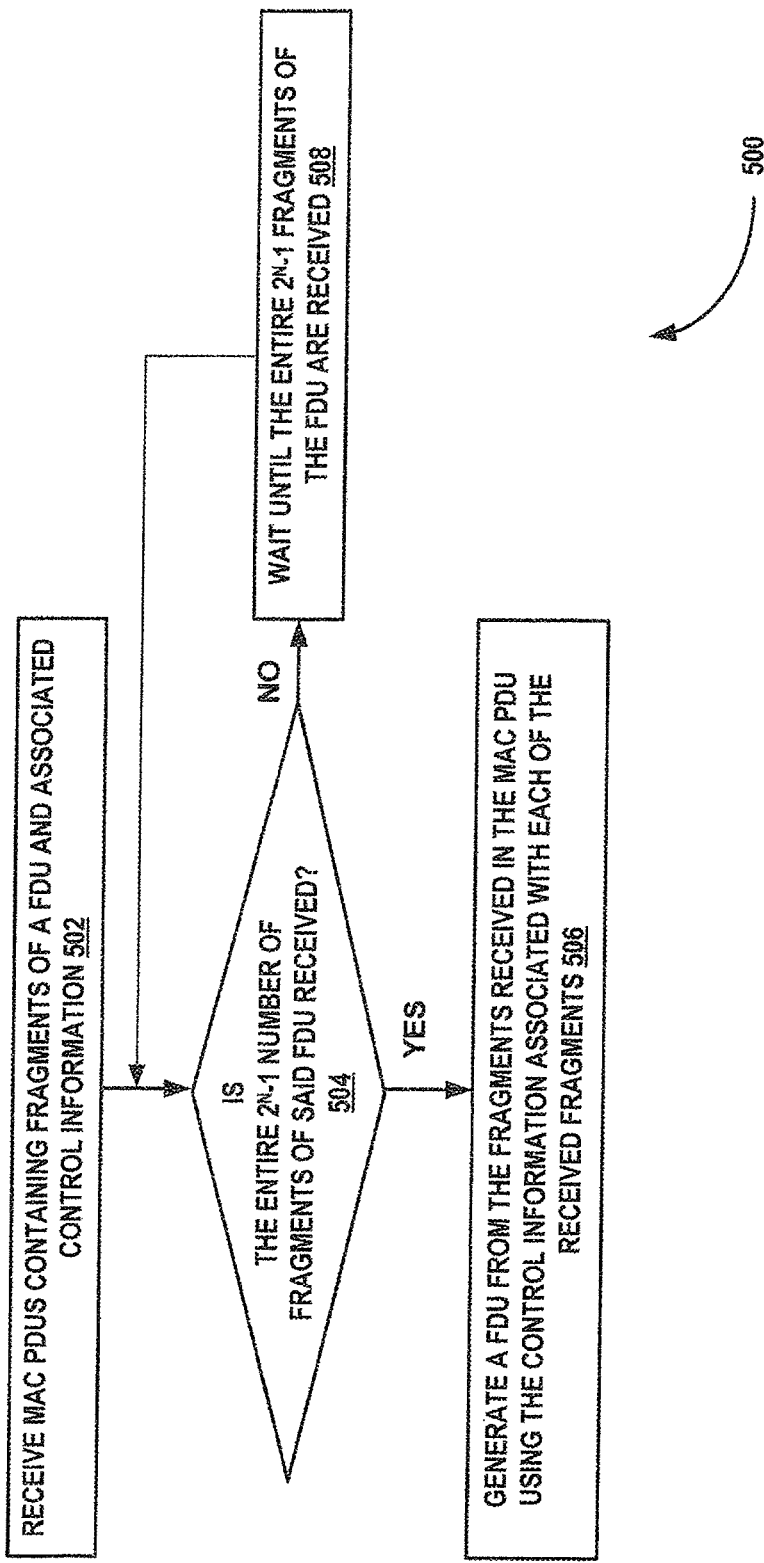
FIG. 5 is a process flowchart illustrating an exemplary method of forming a FDU from fragments of the FDU received in payload of MAC PDUs, according to one embodiment

FIG. 5 is a process flowchart 500 illustrating an exemplary method of forming a FDU from fragments of the FDU received in payload of MAC PDUs, according to one embodiment. At step 502, MAC PDU(s) containing fragment of a FDU and associated control information is received from the transmitting device 102 over the network 110. Since the FDU is fragmented into $2^n-1$ number of fragments at the transmitting device 102, it is determined whether entire $2^n-1$ fragments are received from the transmitting device 102 by the reassembly module 108, at step 504. If $2^n-1$ fragments are received in the MAC PDUs from the transmitting device 102, then at step 506, a FDU is generated from the $2^n-1$ fragments packed in the MAC PDUs using the respective control information. Since the FDU is variable in size and size of FDU is not known to the receiving device 104, the receiving device 104 combines $2^n-1$ fragments to form the FDU in case of fragmentation of the FDU. If the entire $2^n-1$ fragments are not received, then at step 508, the receiving device 104 waits for pending fragments of said MU before generating the FDU.

Figure 6:
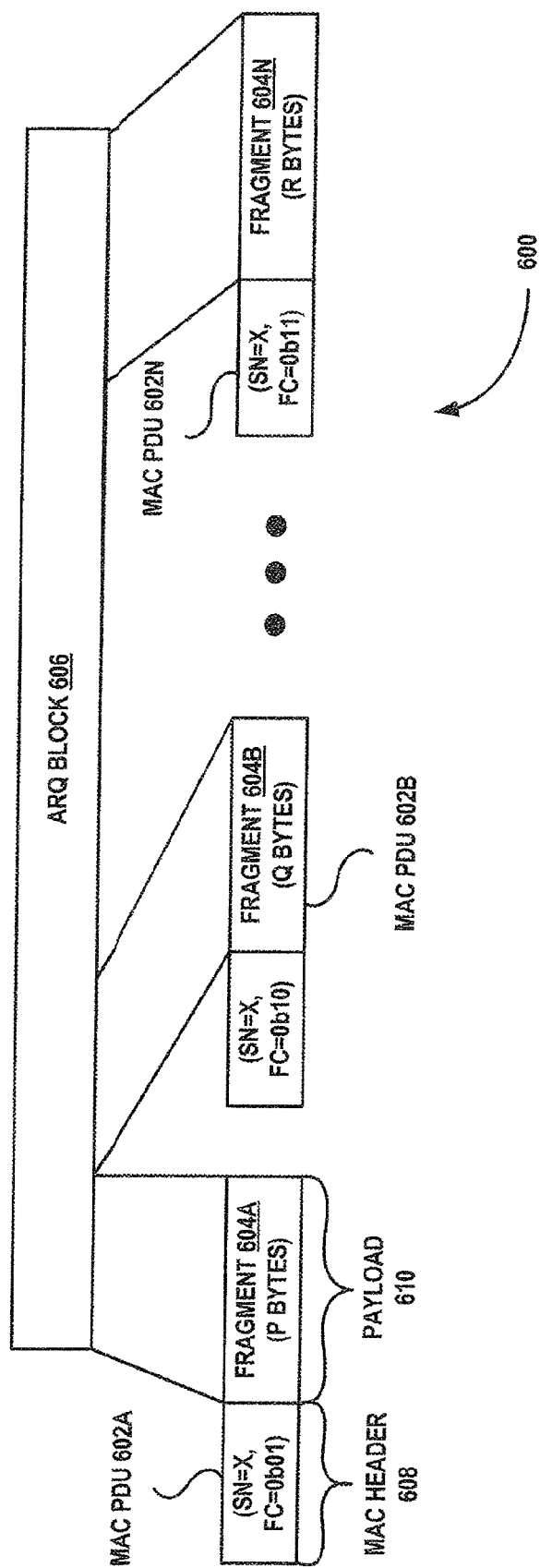
FIG. 6 is a schematic representation depicting MAC PDUs carrying fragments of an Automatic Repeat Request (ARQ) block and associated control information.

FIG. 6 is a schematic representation 600 depicting MAC PDUs 602A-N carrying fragments 604A-N of an ARQ block 606 and associated control information. Particularly, the schematic representation 600 depicts a case when a FDU is an ARQ block 606 consisting of one or more unfragmented MAC SDUs. Typically, ARQ block 606 is fragmented into two or more fragments based on resources available for transmission. According to the present invention, the ARQ block 606 is fragmented into $2^n-1$ number of fragments. Each of the $2^n-1$ fragments may be of same size of different size.

As shown, each of the MAC PDUs 602A-N contains a MAC header 608 and a payload 610. Upon fragmenting the ARQ block 606, the fragments 604A-N are packed in the payload 610 of the respective MAC PDUs 602A-N and the control information corresponding to each of the fragments 604A-N is encoded in the MAC header 608 of the respective MAC PDUs 602A-N. As described above, control information indicating position of respective fragments 604A-N is encoded in the FC field of the MAC header 608. In one exemplary implementation, the control information contains a non-zero value X which indicates that the payload contains $X^{th}$ fragment of the ARQ block 606, where 'X' is an integer ranging from 1 to $2^n-1$. Thus, the receiving device 104 can determine order of fragments of the ARQ block 606 from the value of 'X' upon receiving the MAC PDUs 1002A-N. Additionally, control information identifying the ARQ block 606 to which respective fragments 604A-N belongs is encoded in the SN field of the MAC header 608. In one exemplary implementation, the control information identifying the ARQ block 606 includes sequence number assigned to the ARQ block 606.

Consider that, number of bits (n) used to represent size of FC field is '2' and sequence number of the ARQ block 606 is SN #x. In such case, the ARQ block 606 is fragmented into $2^n-1$ fragments (i.e., three fragments), each of size p, q and r bytes respectively. The fragments 604A, 604B and 604C are packed in the payload 610 of the MAC PDUs 602A, 602B and 602C. The control information for the fragments 604A, 604B and 604C indicating order of the fragments (i.e., 0b01, 0b10, and 0b11) is encoded in the MAC header 608 of the MAC PDUs 602A, 602B and 602C. Also, the sequence number 'x' identifying the ARQ block 606 to which the fragments 604A, 604B, and 604C belongs is encoded in the MAC header 608 of the MAC PDUs 602A, 602B and 602C.

Figure 7A:
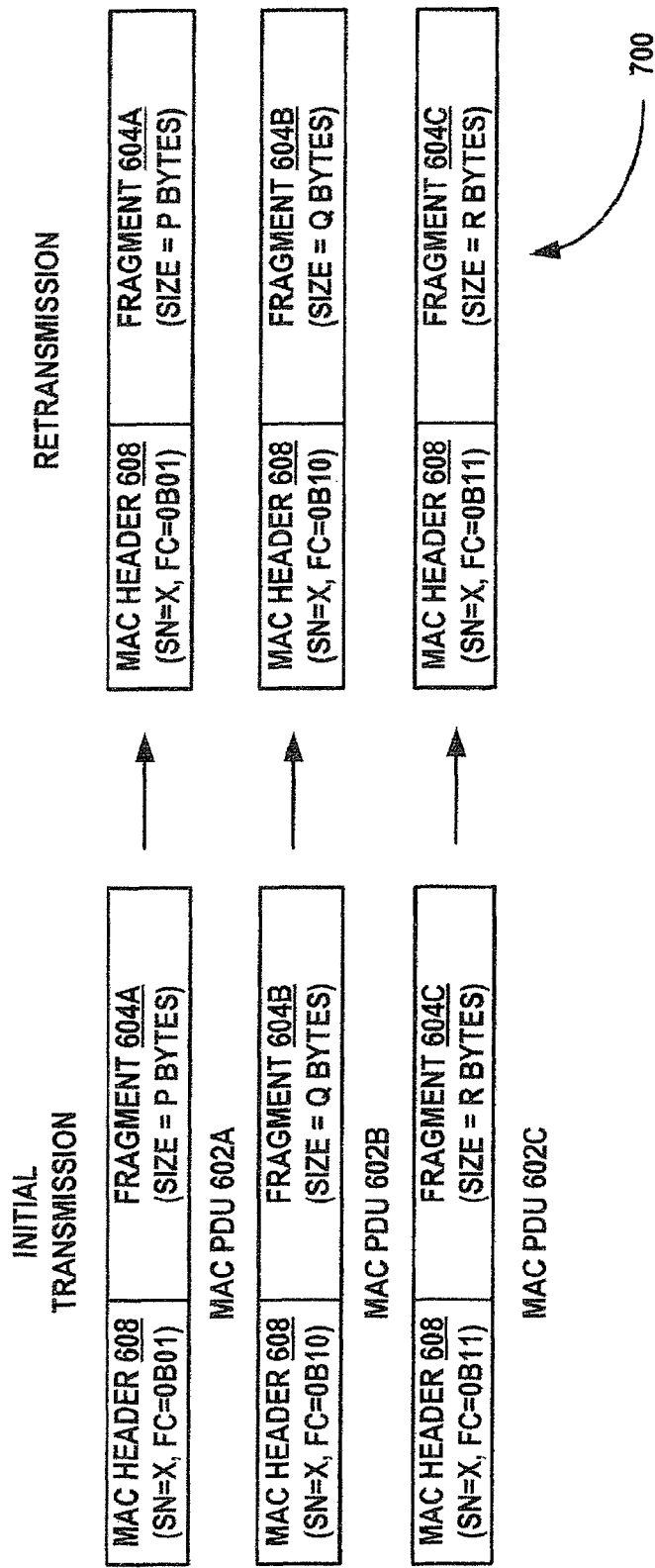
FIGS. 7A and 7B are schematic diagrams illustrating retransmission of ARQ blocks to a receiving device.
Figure 7B:
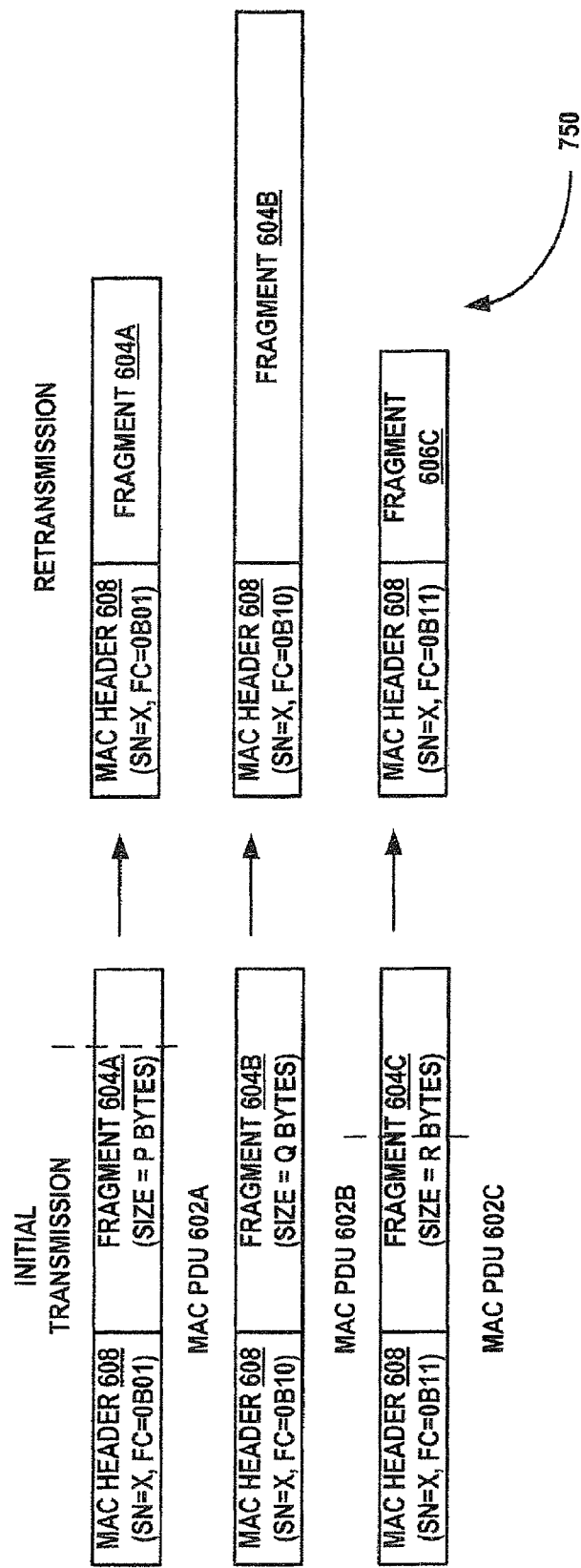

FIGS. 7A and 7B are schematic diagrams 700 and 750 illustrating re-transmission of ARQ blocks to the receiving device 104. When all the fragments of the ARQ block 606 is not received by the receiving device 104, the transmitting device 102 re-transmits the fragments of the ARQ blocks 606 as shown in FIGS. 7A and 7B.

As shown in FIG. 7A, the fragmentation module 106 re-transmits the fragments 604A, 604B and 604C of the ARQ block 606 in the MAC PDUs 302A-C to the receiving device 104 without re-arranging the fragments 604A, 604B and 604C. That means the size of the fragments 604A-C packed in the MAC PDUs 602A-C remains same as during initial transmission of the fragments 604A-C. As shown in FIG. 7B, the fragmentation module 106 divides the ARQ block 606 into three fragments 604A-C of different sizes and re-transmits the fragments 604A-C in the payload 610 of the MAC PDUs 602A-C. It can be seen from FIG. 7B that, the size of the fragments 604A-C during re-transmission is different from the size of the fragments 604A-C during initial transmission. For example, the fragments 604A and 604B formed during re-transmission are smaller compared to the initially transmitted fragments 604A and 604C respectively. Similarly, the fragment 604B formed during re-transmission is larger in size as compared to the initially transmitted fragment 604B. Thus, it can be noted that size of fragments of an ARQ block during re-transmission can vary from size of the initial transmitted fragments.

Figure 8:
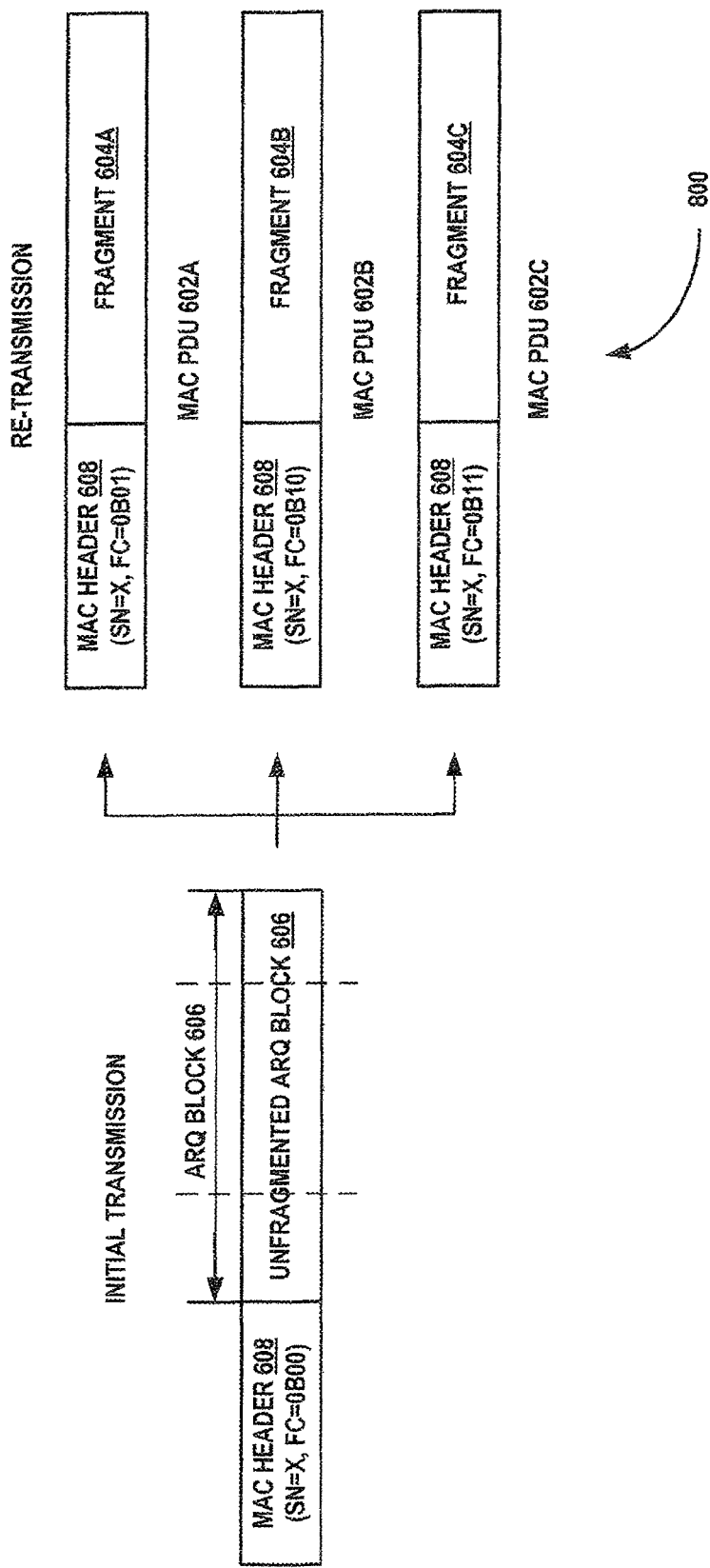
FIG. 8 is a schematic representation illustrating fragmentation of an ARQ block into $2^n-1$ fragments and transmission of the $2^n-1$ fragments in MAC PDUs during re-transmission.

FIG. 8 is a schematic representation 800 illustrating fragmentation of the ARQ block 606 into $2^n-1$ fragments and transmission of the $2^n-1$ fragments in MAC PDUs during re-transmission. Consider that, the transmitting device 102 transmits the unfragmented ARQ block 606 in a MAC PDU to the receiving device 104 during initial transmission and the receiving device 104 does not receive the unfragmented ARQ block 606. In such case, during re-transmission, the fragmentation module 106 divides the initially transmitted unfragmented ARQ block 606 into three fragments 604A-C (as n=2) and transmits the fragments 604A-C in the payload 610 of the MAC PDUs 602A-C to the receiving device 104. In one exemplary implementation, the fragmentation module 106 may fragment the ARQ block 606 in three equal sized fragments 604A-C of equal size. In another exemplary implementation, the fragmentation module 106 may fragment the ARQ block 606 into three fragments 604A-C of different sizes. In such case, the fragmentation module 106 determines the size of each of the fragments 604A-C as follows:

Size of fragment 604A≥size of ARQ block 606/3;

Size of fragment 604B≥(size of ARQ block 606−size of fragment 604A)/2; and

Size of fragment 604C≥(size of ARQ block 606−size of fragment 604B−size of fragment 604A).

Figure 9:
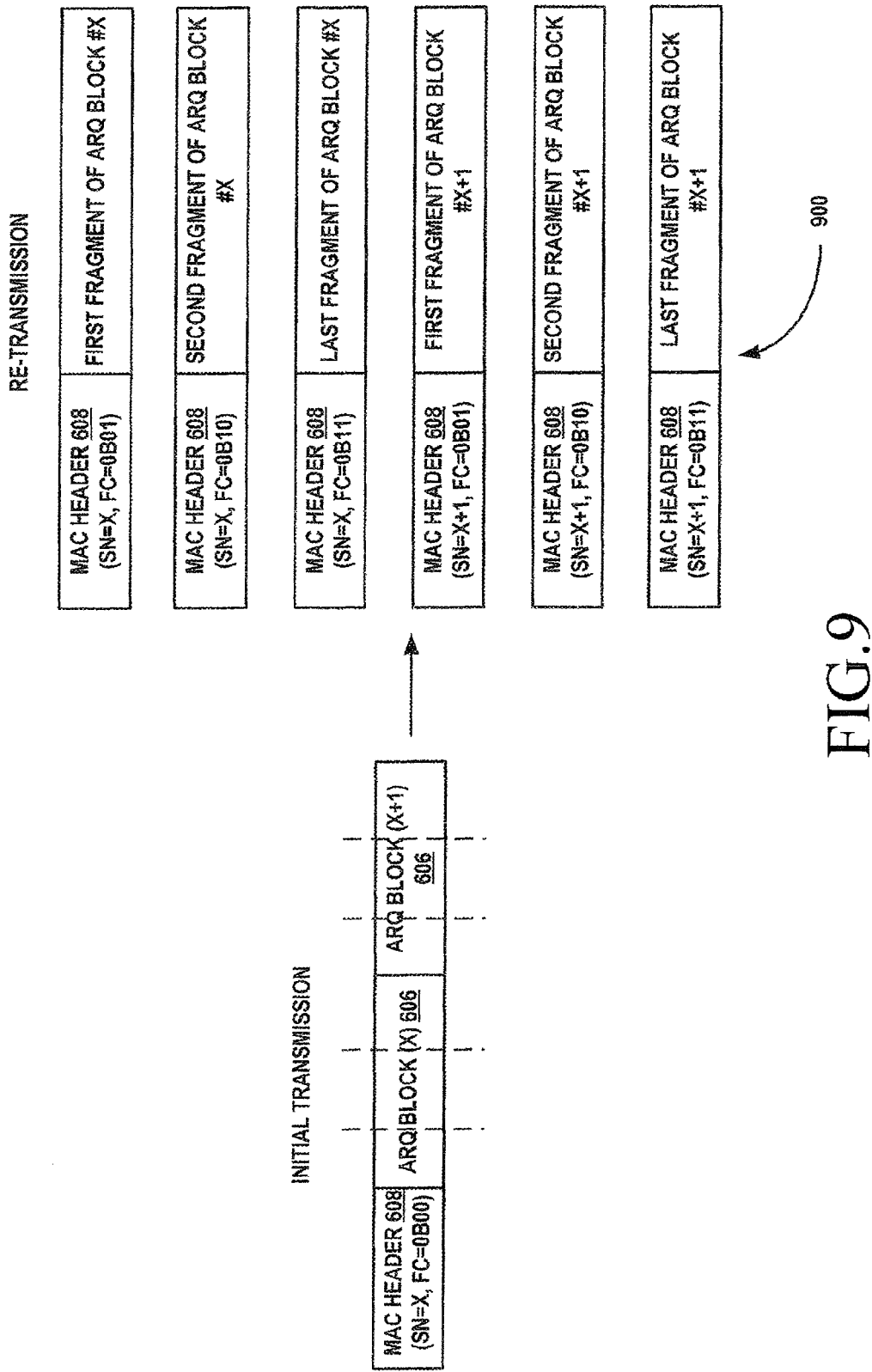
FIG. 9 is a schematic representation illustrating fragmentation of ARQ blocks into $2^n-1$ fragments and transmitting the $2^n-1$ fragments in MAC PDUs during re-transmission.

FIG. 9 is a schematic representation 900 illustrating fragmentation of ARQ blocks 606 into $2^n-1$ fragments and transmitting the $2^n-1$ fragments in MAC PDUs during re-transmission. The scenario depicted in FIG. 9 is similar to the scenario depicted in FIG. 8 in which single unfragmented ARQ block 606 transmitted during initial transmission is fragmented into fixed number fragments during re-transmission. As depicted in FIG. 9, each of the unfragmented ARQ blocks 606 transmitted in same MAC PDU during initial transmission is independently fragmented into $2^n-1$ fragments (three fragments for n=2) and transmitted in payload of different MAC PDUs during re-transmission.

Figure 10:
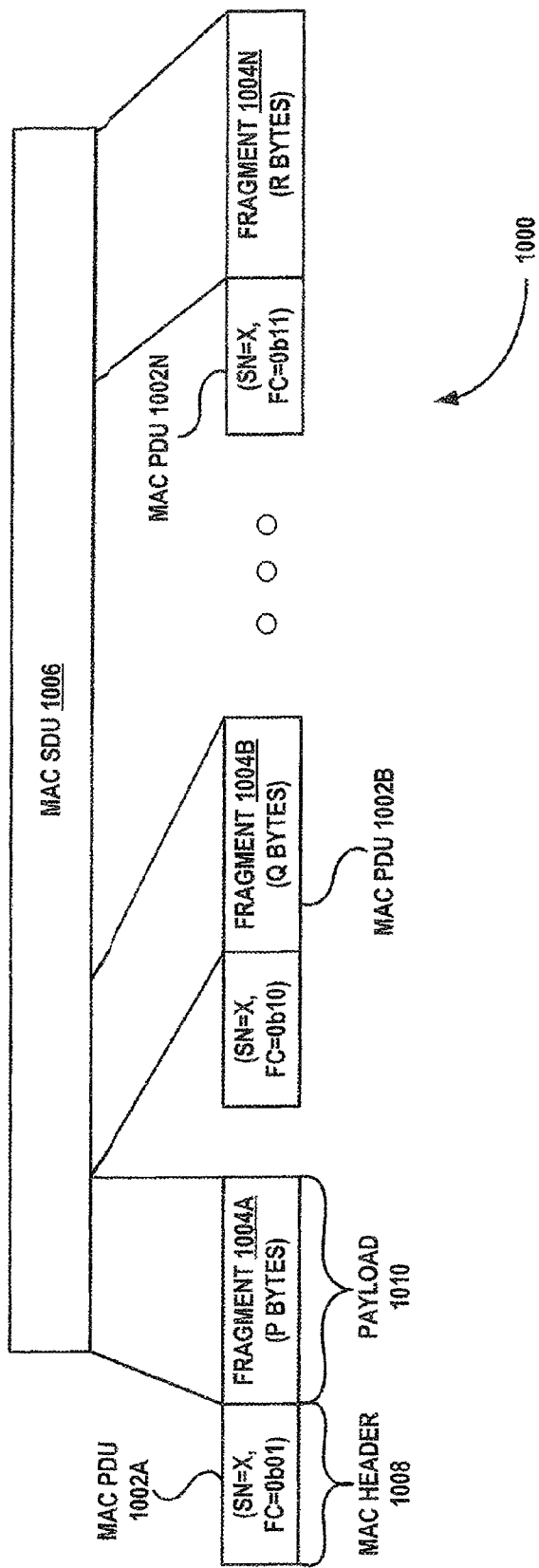
FIG. 10 is a schematic representation depicting MAC PDUs carrying fragments of a MAC Service Data Unit (SDU) and associated control information.

FIG. 10 is a schematic representation 1000 depicting MAC PDUs 1002A-N carrying fragments 1004A-N of a MAC SDU 1006 and associated control information. Particularly, the schematic representation 1000 depicts a case when a FDU is a MAC SDU 1006 of a non-ARQ connection. According to the present invention, the MAC SDU 1006 of a non ARQ connection is fragmented into $2^n-1$ number of fragments, where 'n' is equal to number of bits used to represent the FC field. Each of the $2^n-1$ fragments may be of same size of different size.

As shown, each of the MAC PDUs 1002A-N contains a MAC header 1008 and a payload 1010. Upon fragmenting the MAC SDU 1006, the fragments 1004A-N is packed in the payload 1010 of the respective MAC PDUs 1002A-N and the control information corresponding to each of the fragments 1004A-N is encoded in the MAC header 1008 of the respective MAC PDUs 1002A-N. As described above, control information indicating position of respective fragments 1004A-N is encoded in the FC field of the MAC header 1008. In one exemplary implementation, the control information contains a non-zero value X which indicates that the payload contains $X^{th}$ fragment of the MAC SDU 1006, where 'X' is an integer ranging from 1 to $2^n-1$. Thus, the receiving device 104 can determine order of fragments of the MAC SDU 1006 from the value of 'X' upon receiving the MAC PDUs 1002A-N. Additionally, control information identifying the MAC SDU 1006 to which respective fragments 1004A-N belongs is encoded in the SN field of the MAC header 1008. In one exemplary implementation, the control information identifying the MAC SDU 1006 includes sequence number assigned to the MAC SDU 1006.

Consider that, number of bits (n) used to represent size of FC field is '2' and sequence number of the MAC SDU 1006 is SN #x. In such case, the MAC SDU 1006 is fragmented into $2^n-1$ fragments (i.e., three fragments), each of size p, q and r bytes respectively. The fragments 1004A, 1004B and 1004C are packed in the payload 1010 of the MAC PDUs 1002A, 1002B and 1002C. The control information for the fragments 1004A, 1004B and 1004C indicating order of the fragments (i.e., 0b01, 0b10, and 0b11) is encoded in the MAC header 1008 of the MAC PDUs 1002A, 1002B and 1002C. Also, the sequence number 'x' identifying, the MAC SDU 1006 to which the fragments 1004A, 1004B, and 1004C belongs is encoded in the MAC header 1008 of the MAC PDUs 1002A, 1002B and 1002C.

Figure 11:
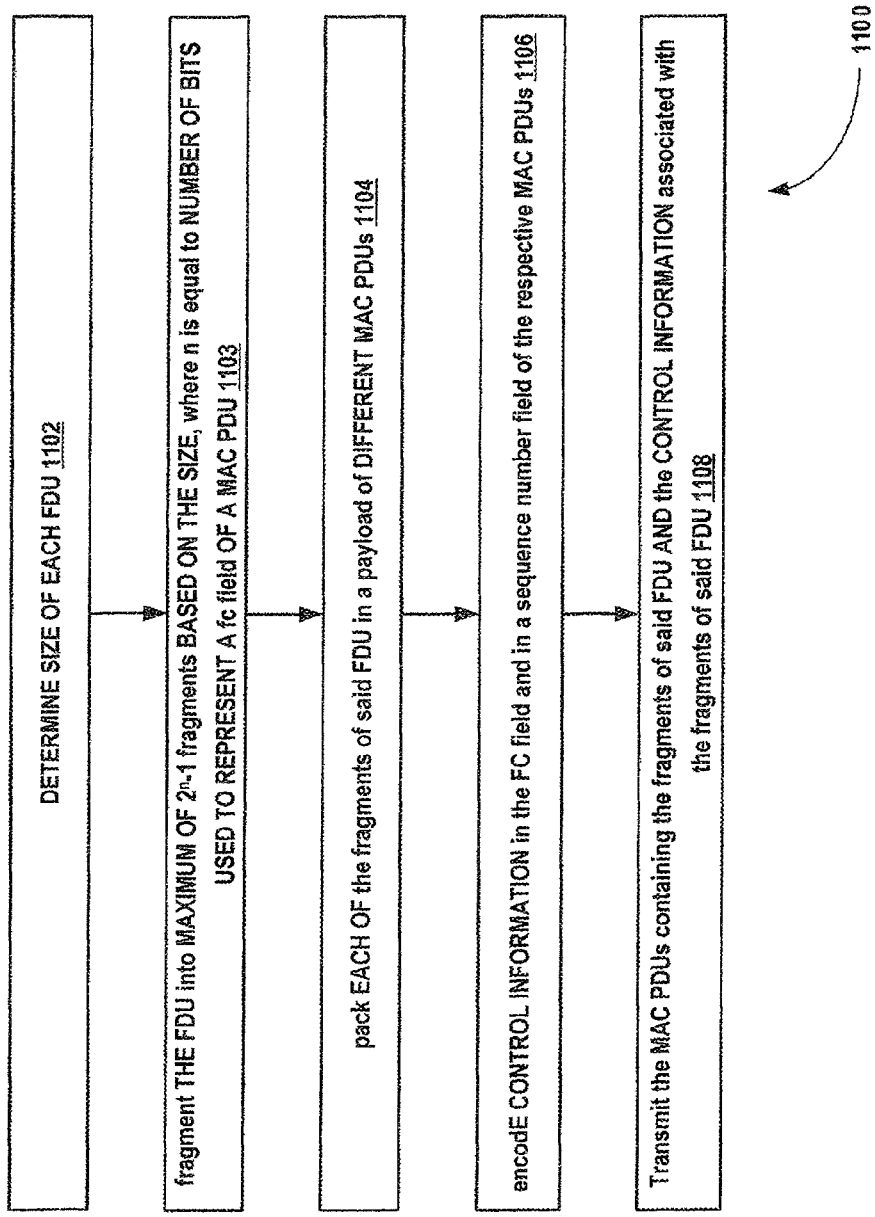
FIG. 11 is a process flowchart illustrating an exemplary method of transmitting fragmentable data units in the wireless network environment, according to another embodiment.

FIG. 11 is a process flowchart 1100 illustrating an exemplary method of transmitting fragmentable data units in the wireless network environment 100, according to another embodiment. When FDUs are received from upper protocol layers, size of each PDU is determined by the fragmentation module 106, at step 1102. At step 1103, each FDU is fragmented into maximum of ($2^n-1$) number of fragments by the fragmentation module 106. The value of 'n' is equal to the number of bits used to represent size of Fragmentation Control (FC) field in a Medium Access Control (MAC) header of a MAC Protocol Data Unit (PDU). In one embodiment, the number of fragments to be formed from each FDU is determined based on bandwidth available for transmitting the fragments to the receiving device 104. It can be noted that, size of the fragments formed from the FDU may be same or different; however the total size of the fragments is equal to size of entire FDU.

At step 1104, each of the fragments of the FDU are packed in a payload of different MAC PDUs. At step 1106, control information associated with each fragment is encoded in FC field and SN field of the respective MAC PDUs. The control information encoded in the FC field indicates position of the respective fragment with respect to other fragments of the FDU. Exemplary control information encoded in the FC field is illustrated in FIG. 4. Referring to FIG. 4, the control information equal to zeros indicates that one or more unfragmented FDUs are packed in the payload of the MAC PDU. If the FC field contains a non-zero value X, then it indicates that the payload contains $X^{th}$ fragment of the FDU, where X is an integer ranging from 1 to $2^n-1$.

The control information encoded in the SN field helps identify the FDU to which said each fragment belongs. In one exemplary implementation, the control information encoded in the SN field includes sequence number associated with the FDU to which said each fragment belongs. At step 1108, the MAC PDUs containing fragments of the FDU and the associated control information is transmitted to the receiving device 104.

According to an embodiment described in FIG. 11, the FDU can be fragmented into any number of fragments less than or equal to $2^n-1$. The number of fragments to be formed from the FDU is determined based on resources available for transmission. As described above, control information is encoded in FC field of a MAC PDU to indicate which fragment is encoded in respective payload of the MAC PDU. The control information may include value ranging from 1 to $2^n-1$.

Figure 12A:
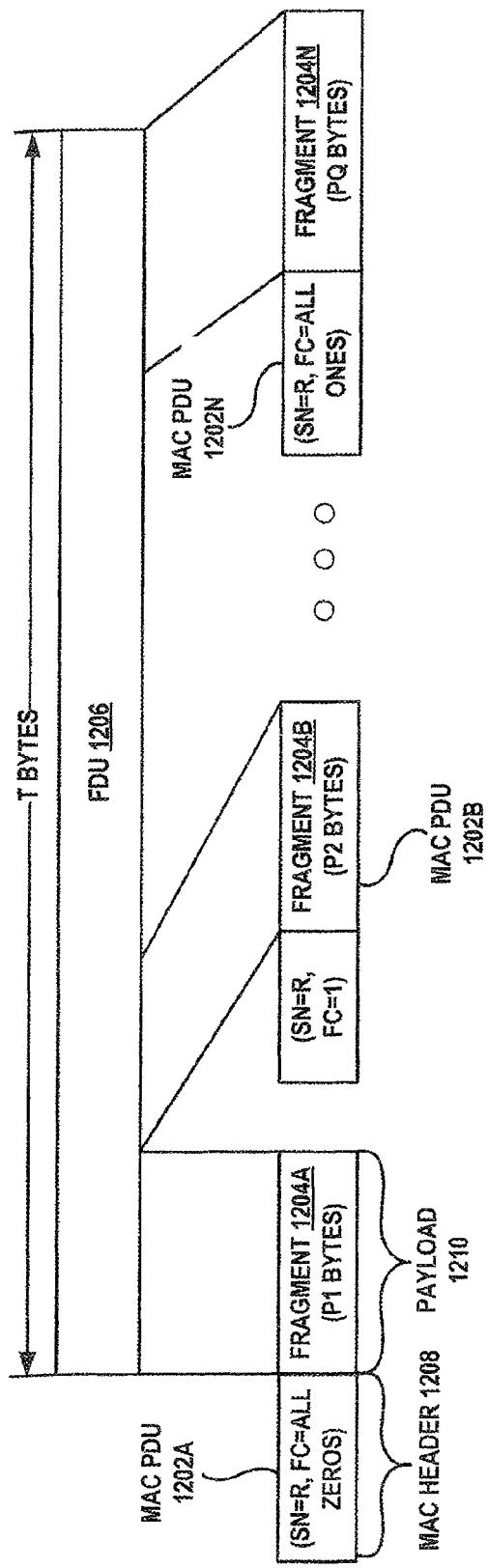
FIGS. 12A-C are schematic representations illustrating exemplary ways of indicating the MAC PDU carrying last fragment of a FDU.
Figure 12B:
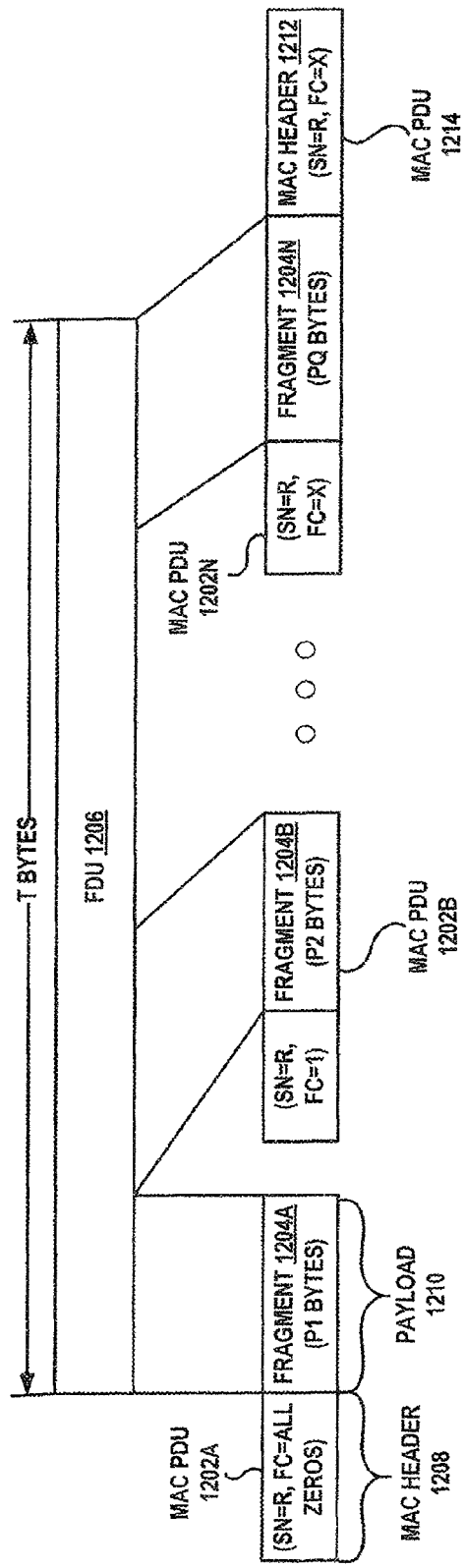
Figure 12C:
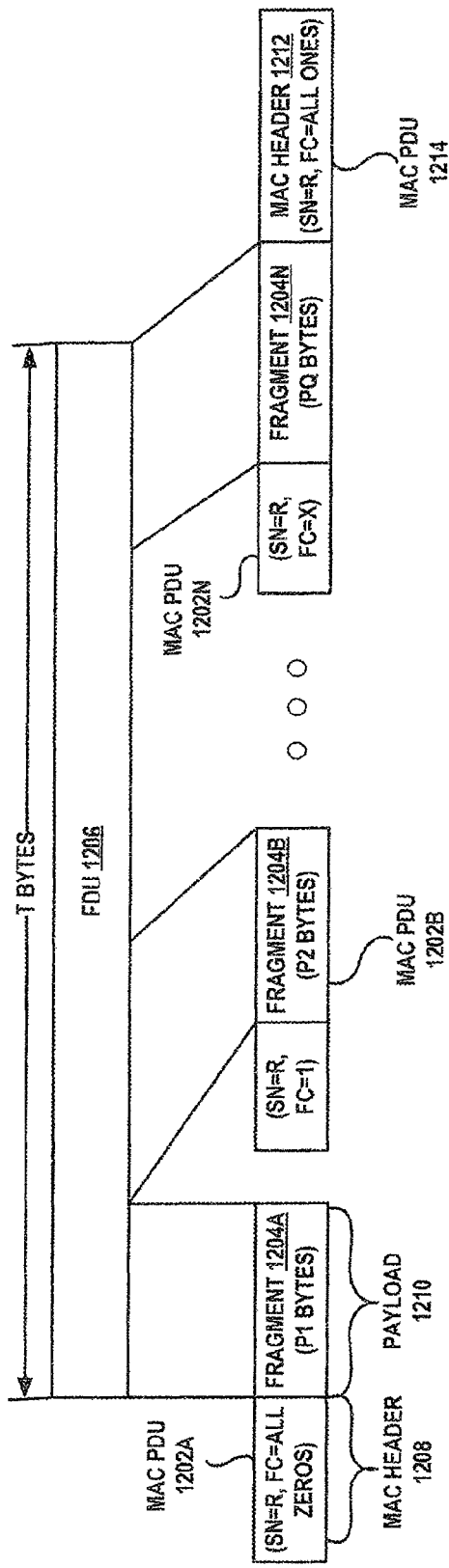

If the FC field contains value equal to $2^n-1$, then it implies that the payload contains the last fragment of the FDU. This case is applicable when number of fragments formed from the FDU 1206 is equal to $2^n-1$ as illustrated in FIG. 12A. When the number of fragments is less than $2^n-1$, same control information is encoded in the FC field and the SN field of an additional MAC header 1212 as that encoded in the FC field and the SN field of the MAC PDU carrying the last fragment of the FDU. Then, the MAC PDU 1214 with only MAC header 1212 encoding the same control information is transmitted following the MAC PDU which carries the last fragment of the FDU as illustrated in FIG. 12B. Thus, the value in the FC field of the MAC PDU 1214 with only MAC header 1212 indicates the total number of fragments of the FDU. Alternatively, when the number of fragments is less than $2^n-1$, then value equal to $2^n-1$ is encoded in the FC field of additional MAC header 1212 and the MAC PDU 1214 with only MAC header 1212 containing the value $2^n-1$ is transmitted to the receiving device 104 substantially following the MAC PDU 1202N which carries the last fragment of the HDU as illustrated in FIG. 12C. This enables the receiving device 104 in identifying the MAC PDU carrying the last fragment of the FDU when the number of fragments of the FDU is less than $2^n-1$. Also, the value in the FC field of the MAC PDU 1202N indicates total number of fragments of the FDU.

Figure 13:
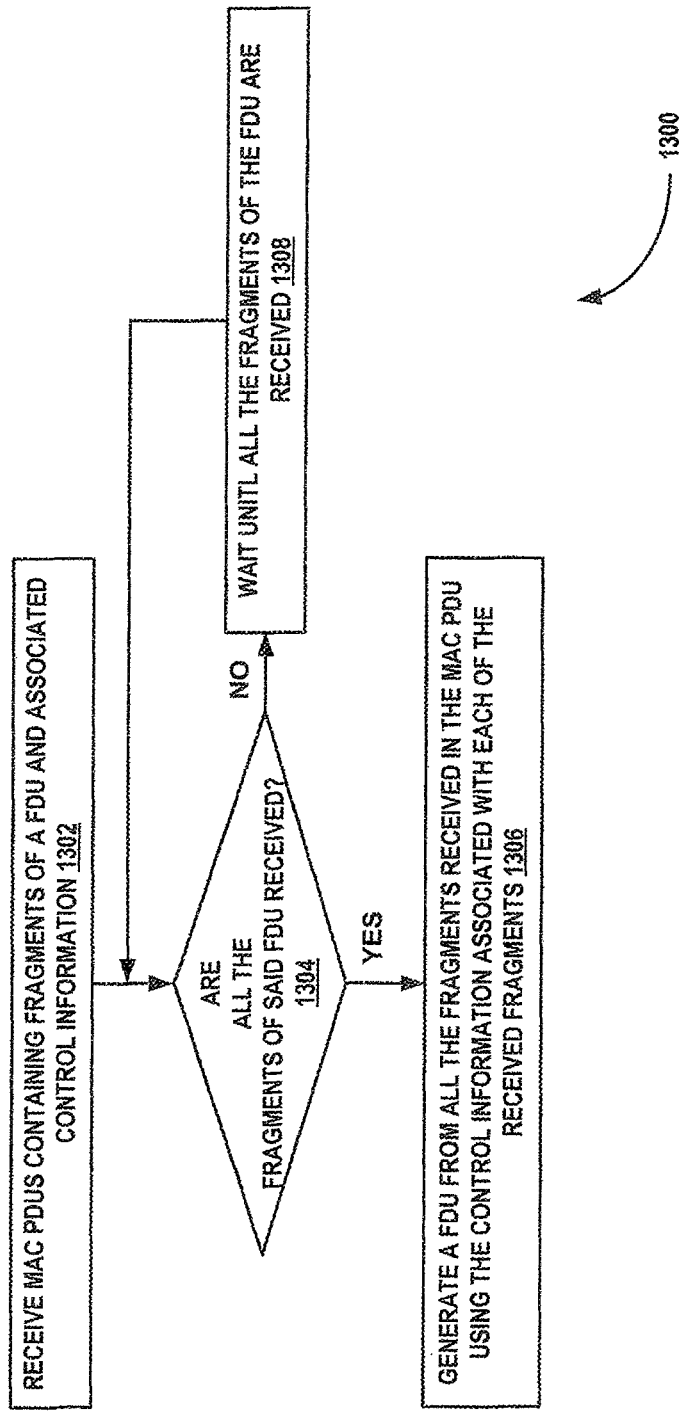
FIG. 13 is a process flowchart illustrating an exemplary method of forming a FDU from fragments of the FDU received in payload of MAC PDUs, according to yet another embodiment.

FIG. 13 is a process flowchart 1300 illustrating an exemplary method of forming a FDU from fragments of the FDU received in payload of MAC PDUs, according to another embodiment. At step 1302, MAC PDUs containing fragments of a FDU and associated control information are received from the transmitting device 102 over the network 110. At step 1304, it is determined whether all the fragments are received from the transmitting device 102 by the reassembly module 108. In order to determine whether all the fragments are received from the transmitting device 102, the reassembly module 108 determines the number of fragments transmitted by the transmitting module 102 for a FDU. In one embodiment, the reassembly module 108 determines that the number of fragments transmitted by the transmitting module 102 is equal to $2^n-1$ if a MAC PDU carrying fragment of FDU is received by the reassembly module and the FC field in the MAC header of the received MAC PDU is set to $2^n-1$.

In another embodiment, the reassembly module 108 determines that the number of fragments transmitted by the transmitting module 102 on receiving a MAC PDU with only MAC header where the number of fragments is equal to value of the FC field in the MAC PDU with only MAC header. In yet another embodiment, the reassembly module 108 determines that the number of fragments transmitted by the transmitting module 102 on receiving a MAC PDU with only MAC header, where the number of fragments is equal to value of FC field in the MAC header of MAC PDU received prior to receiving the MAC PDU with only MAC header. Upon determining the number of fragments of said FDU, the reassembly module 108 determines whether all the fragments of the FDU have been successfully received from the transmitting device 102 based on the control information received in MAC PDUs carrying fragments of said FDU.

If all fragments are received in the MAC PDUs from the transmitting device 102, then at step 1306, a FDU is generated from all the fragments packed in the MAC PDUs using the respective control information. Since the FDU is variable in size and size of FDU is not known to the receiving device 104, the receiving device 104 combines received fragments to form the FDU in case of fragmentation of the FDU. If the all the fragments are not received, then at step 1308, the receiving device 104 waits for pending fragments of said FDU before generating the FDU.

Figure 14A:
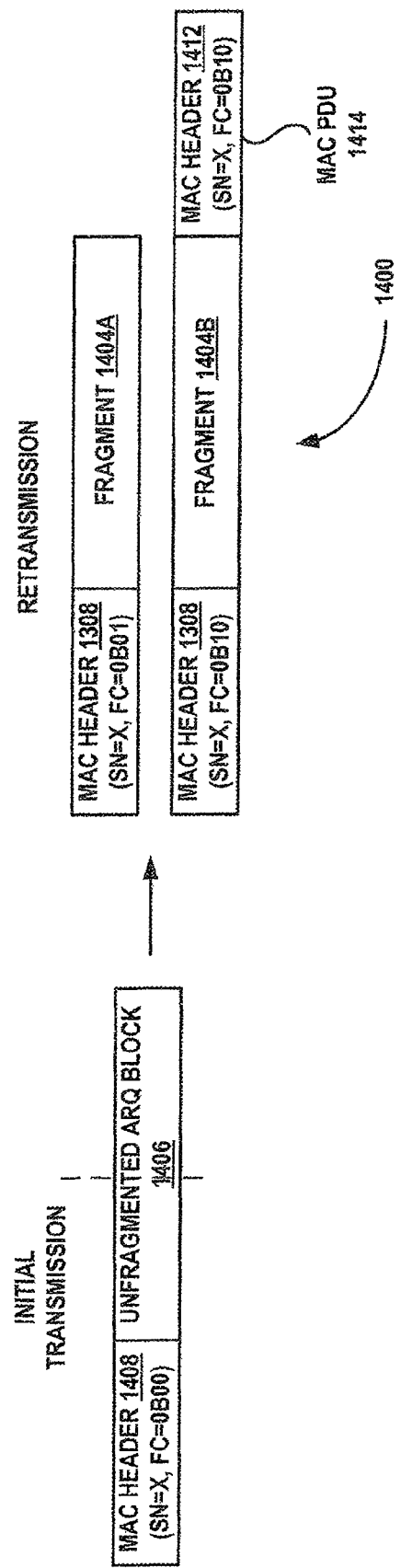
FIGS. 14A-B are schematic representations illustrating fragmentation of an ARQ block into fragments and transmission of the fragments in MAC PDUs during re-transmission.
Figure 14B:
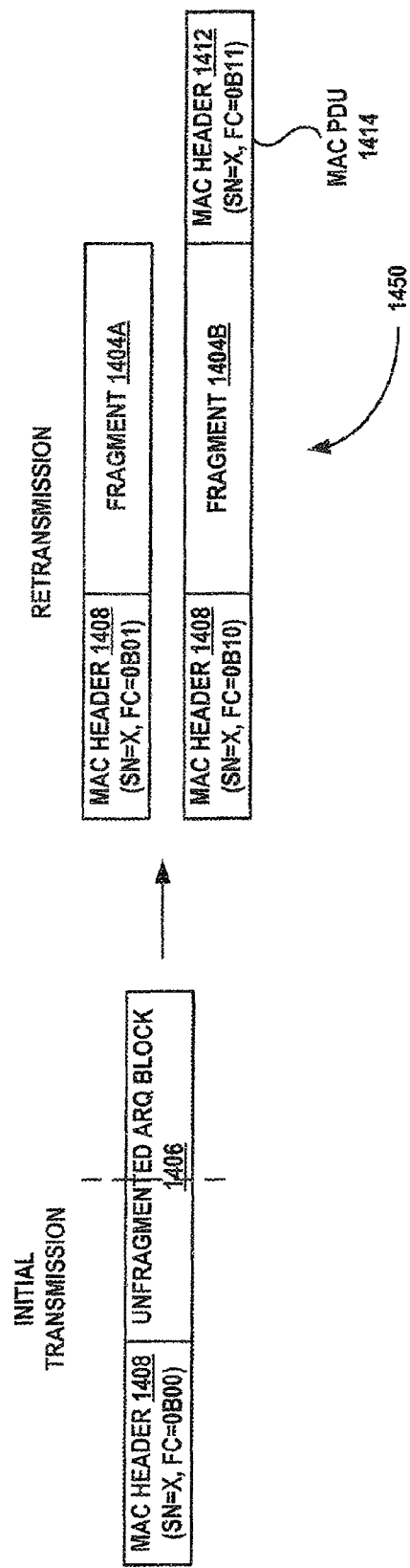

FIGS. 14A-B are schematic representations 1400 and 1450 illustrating fragmentation of the ARQ block 1406 into fragments and transmission of the fragments in MAC PDUs during re-transmission. Consider that, the transmitting device 102 transmits the unfragmented ARQ block 1406 in a MAC PDU to the receiving device 104 during initial transmission and the receiving device 104 does not receive the unfragmented ARQ block 1406. Also, consider that, the number of bits used to represent the size of the FC field is equal to 2.

During re-transmission, the fragmentation module 106 divides the initially transmitted unfragmented ARQ block 1406 into two fragments 1404A-B and transmits the fragments 1404A-B in the payload 1410 of the MAC PDUs 1402A-B to the receiving device 104. It can be noted that, the number of fragments of the ARQ block 1406 is less than $2^n-1$. As depicted in FIG. 14A, the fragmentation module 106 transmits a MAC PDU 1414 with only MAC header 1412 containing the control information (e.g., FC=0b01, SN=x) same as the control information encoded in the MAC PDU 1402B.

As depicted in FIG. 14B, the fragmentation module 106 transmits a MAC PDU 1414 with only MAC header 1412 containing value equal to $2^n-1$ (e.g., FC=0b11, SN=x) to indicate that the MAC PDU 1402B contains the last fragment of the ARQ block 1406. In some embodiments, the fragmentation module 106 transmits the MAC PDU 1414 with only MAC header 1412 concatenated with the MAC PDU 1402B to the receiving device 104.

Figure 15:
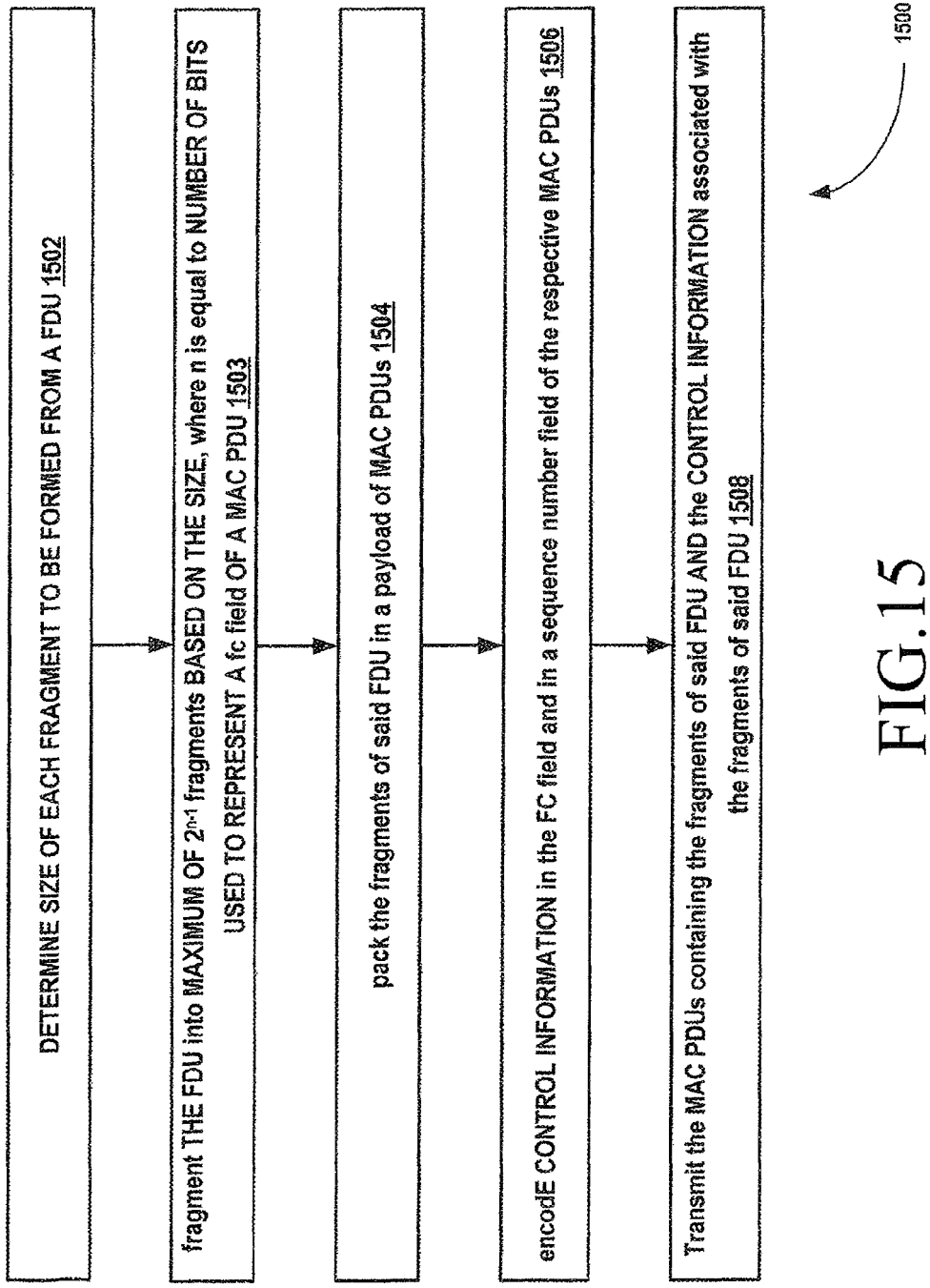
FIG. 15 is a process flowchart illustrating an exemplary method of transmitting FDUs in a wireless network environment, according to yet another embodiment.

FIG. 15 is a process flowchart 1500 illustrating an exemplary method of transmitting fragmentable data units in the wireless network environment 100, according to yet another embodiment. When FDUs are received from upper protocol layers, size of fragments to be formed from each FDU is determined by the fragmentation module 106, at step 1502. At step 1503, each FDU is fragmented into maximum of ($2^{n-1}$) number of fragments by the fragmentation module 106. The value of 'n' is equal to the number of bits used to represent size of Fragmentation Control (FC) field in a Medium Access Control (MAC) header of a MAC Protocol Data Unit (PDU). It can be noted that, size of the fragments of the FDU may be same or different; however the total size of the fragments is equal to size of entire FllU.

At step 1504, the fragments of the FDU are packed in a payload of different MAC PDUs. At step 1506, control information associated with each fragment is encoded in FC field and SN field of the respective MAC PDUs. The control information encoded in the FC field indicates position of the respective fragment with respect to other fragments of the FDU. Exemplary control information encoded in the FC field is illustrated in FIG. 16. Referring to FIG. 16, the control information includes 'n−1' Most Significant Bits and a Least Significant Bit. The 'n−1' MSBs in the FC field indicate order of the fragments of the FDU while the LSB in the FC field indicates whether the fragment packed in the payload of respective MAC PDU is a last fragment. In an alternate embodiment, 'n−1' LSBs are used in the FC field to indicate order of fragments of the FDU while a MSB is used in the FC field to indicate whether fragment packed in payload of respective MAC PDU is a last fragment or not. For example, the value zero in the 'n−1' MSBs and value one in the LSB indicates that the payload of the MAC PDU contains one or more unfragmented FDUs. Similarly, the value X in the 'n−1' MSBs and the value zero in the LSB of the FC field indicates that payload of a MAC PDU contains X+1$^{th}$ fragment of the FDU, where X is an integer ranging from 0 to $(2^{n-1}-2)$ and X+1$^{th}$ fragment is not a last fragment. Further, the value X in the 'n−1' MSBs of the FC field and value one in the LSB of the FC field indicates that payload of a MAC PDU contains X+1$^{th}$ fragment of the FDU, where X is an integer ranging from 0 to $(2^{n-1}-1)$ and X+1$^{th}$ fragment is a last fragment.

The control information encoded in the SN field helps identify the FDU to which said each fragment belongs. In one exemplary implementation, the control information encoded in the SN field includes sequence number associated with the FDU to which said each fragment belongs. At step 1508, the MAC PDUs containing fragments of the FDU and the associated control information is transmitted to the receiving device 104.

Figure 17:
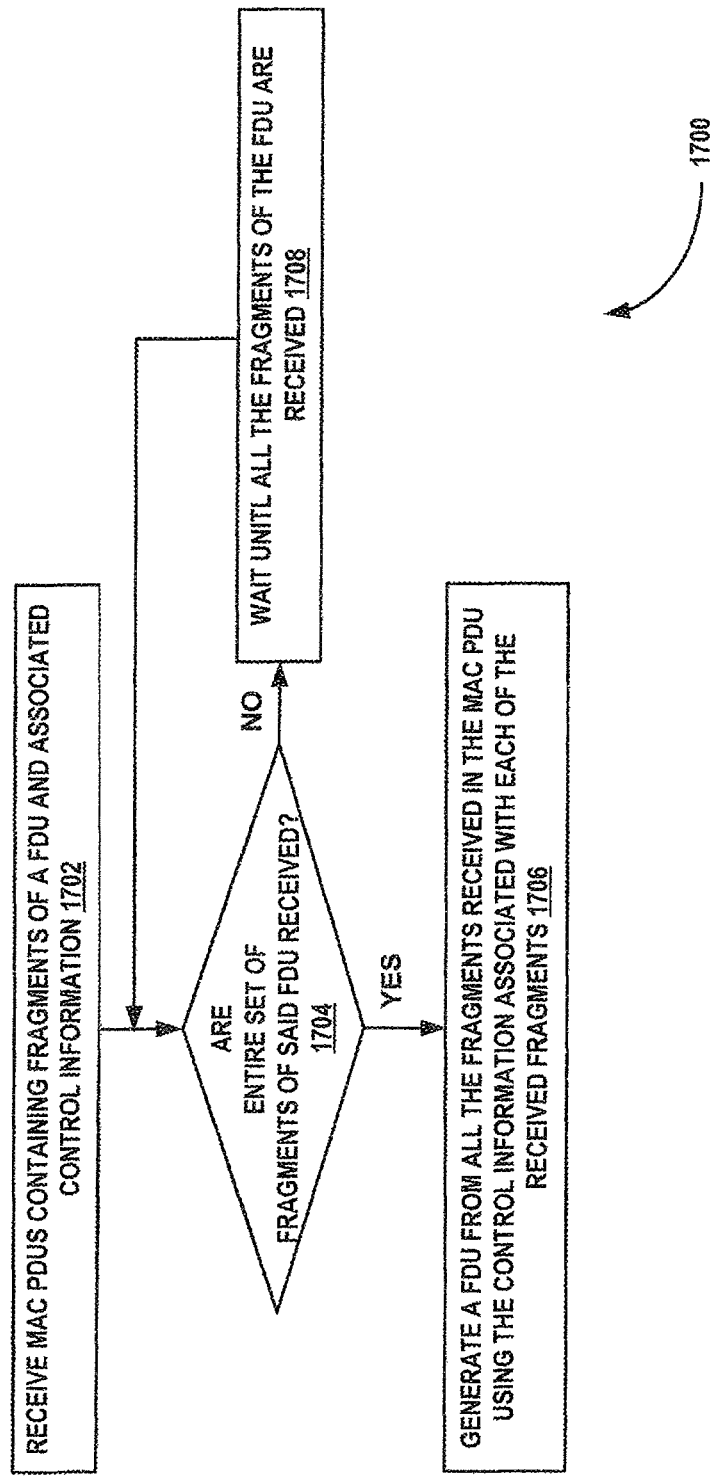
FIG. 17 is a process flowchart illustrating an exemplary method of forming a FDU from fragments of the FDU received in payload of MAC PDUs, according to yet another embodiment.

FIG. 17 is a process flowchart 1700 illustrating an exemplary method of forming a FDU from fragments of the FDU received in payload of MAC PDUs, according to yet another embodiment. At step 1702, MAC PDUs containing fragments of a FDU and associated control information are received from the transmitting device 102 over the network 110. At step 1704, it is determined whether entire set of framents of the FDU are received from the transmitting device 102 by the reassembly module 108. In one embodiment, the reassembly module 108 determines whether entire set of fragments of the FDU are received based on 'n−1' MSBs and LSB in the FC field of the MAC header in each MAC PDU received from the transmitting device 102.

If all fragments are received in the MAC PDUs from the transmitting device 102, then at step 1706, a FDU is generated from the fragments packed in the MAC PDUs using the respective control information. Since the FDU is variable in size and size of FDU is not known to the receiving device 104, the receiving device 104 combines received fragments to form the FDU in case of fragmentation of the FDU. If the all the fragments are not received, then at step 1708, the receiving device 104 waits for pending fragments of said FDU before generating the FDU.

Figure 18:
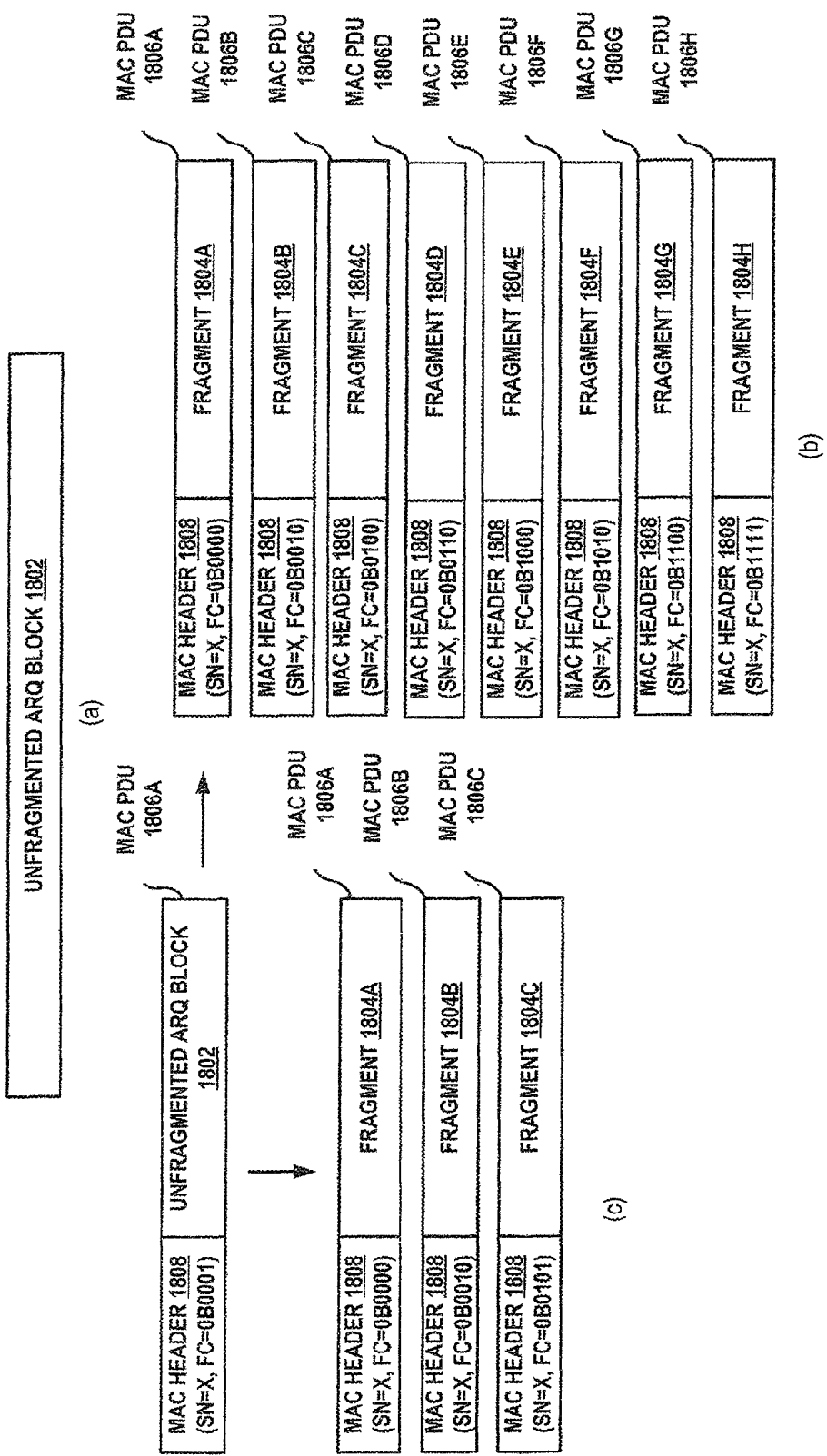
FIG. 18 are schematic representations depicting transmission of an ARQ block to the receiving device.

FIG. 18 is schematic representations depicting transmission of an ARQ block 1802 to the receiving device 104. Particularly, the schematic representations depict scenarios when a FDU is an ARQ block 1802 consisting of one or more unfragmented MAC SDUs. FIG. 18(a) illustrates a scenario in which the unfragmented ARQ block 1802 is transmitted in a MAC PDU 1806A using 'n−1' MSBs and LSBs in FC field. The value zero in the 'n−1' MSBs and value one in the LSB would indicate that payload of a MAC PDU contains the unfragmented ARQ block 1802. For example, the FC field is set to a value 0b0001 to indicate that the payload of the MAC PDU 1806 carries the unfragmented ARQ block 1802.

FIGS. 18(b) and (c) illustrate a scenario in which the ARQ block 1802 is fragmented into multiple fragments 1804A-N based on resources available for transmission and the fragments 1804A-N of the ARQ block 1802 are transmitted in MAC PDUs 1806A-N. According to the present invention, the ARQ block 1802 is fragmented into maximum of $2^{n-1}$ number of fragments. Each of the $2^{n-1}$ fragments may be of same size of different size.

Upon fragmenting the ARQ block 1802, the fragments 1804A-N are packed in the payload 610 of the respective MAC PDUs 1806A-N and the control information corresponding to each of the fragments 604A-N is encoded in the MAC header 608 of the respective MAC PDUs 1806A-N. As described above, control information indicating position of respective fragments 1804A-N is encoded in the FC field of the MAC header 1808. In one exemplary implementation, the control information in the FC field includes 'n−1' Most Significant Bits and Least Significant Bits. The 'n−1' MSBs in the FC field indicate order of the fragments of the ARQ block 1802 while the LSB in the FC field indicates whether the fragment packed in the payload of respective MAC PDU is a last fragment. For example, the value X in the 'n−1' MSBs and the value zero in the LSB of the FC field indicates that payload of a MAC PDU contains X+1$^{th}$ fragment of the ARQ block 1802, where X is an integer ranging from 0 to $(2^{n-1}-2)$ and X+1$^{th}$ fragment is not a last fragment. Further, the value X in the 'n−1' MSBs of the FC field and value one in the LSB of the FC field indicates that payload of a MAC PDU contains X+1$^{th}$ fragment of the ARQ block 1802, where X is an integer ranging from 0 to $(2^{n-1}-1)$ and X+1$^{th}$ fragment is a last fragment.

For the purpose of illustration, consider that number of bits (n) used to represent size of FC field is '4' and sequence number of the ARQ block 1802 is SN #x. In such case, the ARQ block 1802 is fragmented into maximum of 2.4 fragments (i.e., eight fragments). In FIG. 18(b), the ARQ block 1802 is fragmented into eight fragments 1804A-H. The fragments 1804A-H are packed in the payload 1810 of the MAC PDUs 1806A-H. The control information for the fragments 1804A-H indicating order of the fragments (i.e., 0b0000, 0b0010, 0b0100, 0b0110, 0b1000, 0b1010, 0b1100 and 0b1111) is encoded in the MAC header 1808 of the MAC PDUs 1806A-H. Also, the sequence number 'x' identifying the ARQ block 1802 to which the fragments 1804A-H belongs is encoded in the MAC header 1808 of the MAC PDUs 1806A-H. It can be seen that LSB for the fragments 1804A-G is set to zero to indicate that these are not last fragment of the ARQ block 1802. However, LSB for the fragment 1804H is set to 1 to indicate that the fragment 1804H is the last fragment of the ARQ block 1802. It can also be seen that, value of the 'n−1' MSBs ranges from 0-7 for the 1$^{St}$ to 8$^{th}$ fragment respectively.

In FIG. 18(c), the ARQ block 1802 is fragmented into three fragments 1804A-H which is less than value $2^{n-1}$ (i.e., eight fragments). The fragments 1804A-C are packed in the payload 1810 of the MAC PDUs 1806A-C. The control information for the fragments 1804A-C indicating order of the fragments (i.e., 0b0000, 0b0010, 0b0101) is encoded in the MAC header 1808 of the MAC PDUs 1806A-C. Also, the sequence number 'x' identifying the ARQ block 1802 to which the fragments 1804A-C belongs is encoded in the MAC header 1808 of the MAC PDUs 1806A-C. It can be seen that LSB for the fragments 1804A and 1804B is set to zero to indicate that these are not last fragment of the ARQ block 1802. However, LSB for the fragment 1804C is set to 1 since the fragment 1804C is the last fragment of the ARQ block 1802.

Figure 19:
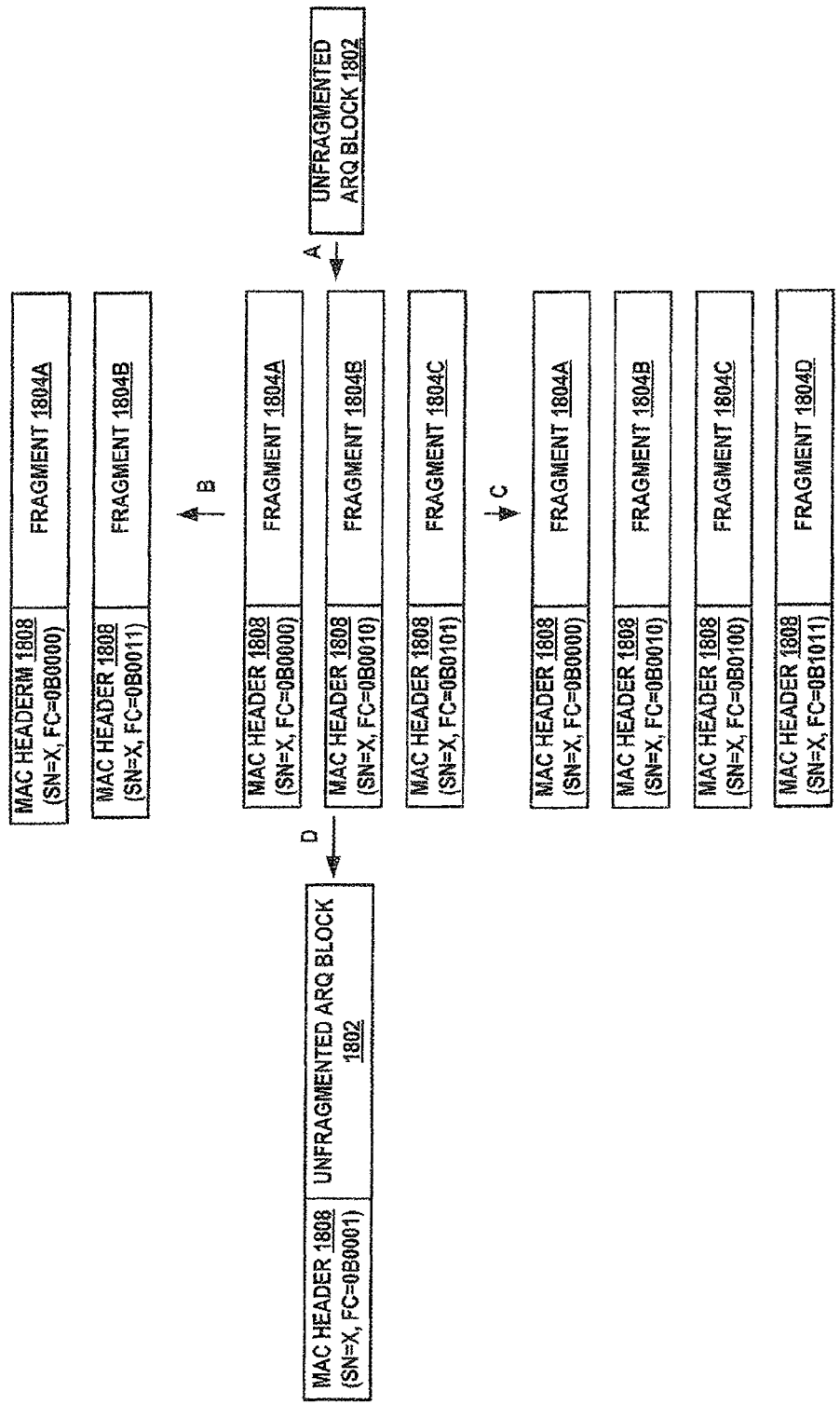
FIG. 19A-D are schematic representations depicting transmission of an ARQ block during initial transmission and re-transmission.

FIG. 19A-D are schematic representations depicting transmission of the ARQ block 1802 during initial transmission and re-transmission. As shown in FIG. 19A, the ARQ block 1802 is fragmented into three fragments 1804A-C and the three fragments 1804A-C are transmitted in different MAC PDUs 1806A-C during initial transmission. However, during re-transmission, the ARQ block 1802 is re-arranged into two fragments 1804A-B and the two fragments 1804A-B are transmitted in different MAC PDUs 1806A-B, as depicted in FIG. 19B. Similarly, as shown in FIG. 19C, the ARQ block 1802 is re-arranged into four fragments 1804A-D and the four fragments 1804A-D are transmitted in different MAC PDUs 1806A-D during re-transmission. In case, if the entire ARQ block 1802 is required to be transmitted during re-transmission, the unfragmented ARQ block 1802 is transmitted in the MAC PDU 1806A, as shown in FIG. 19D.

Figure 20:
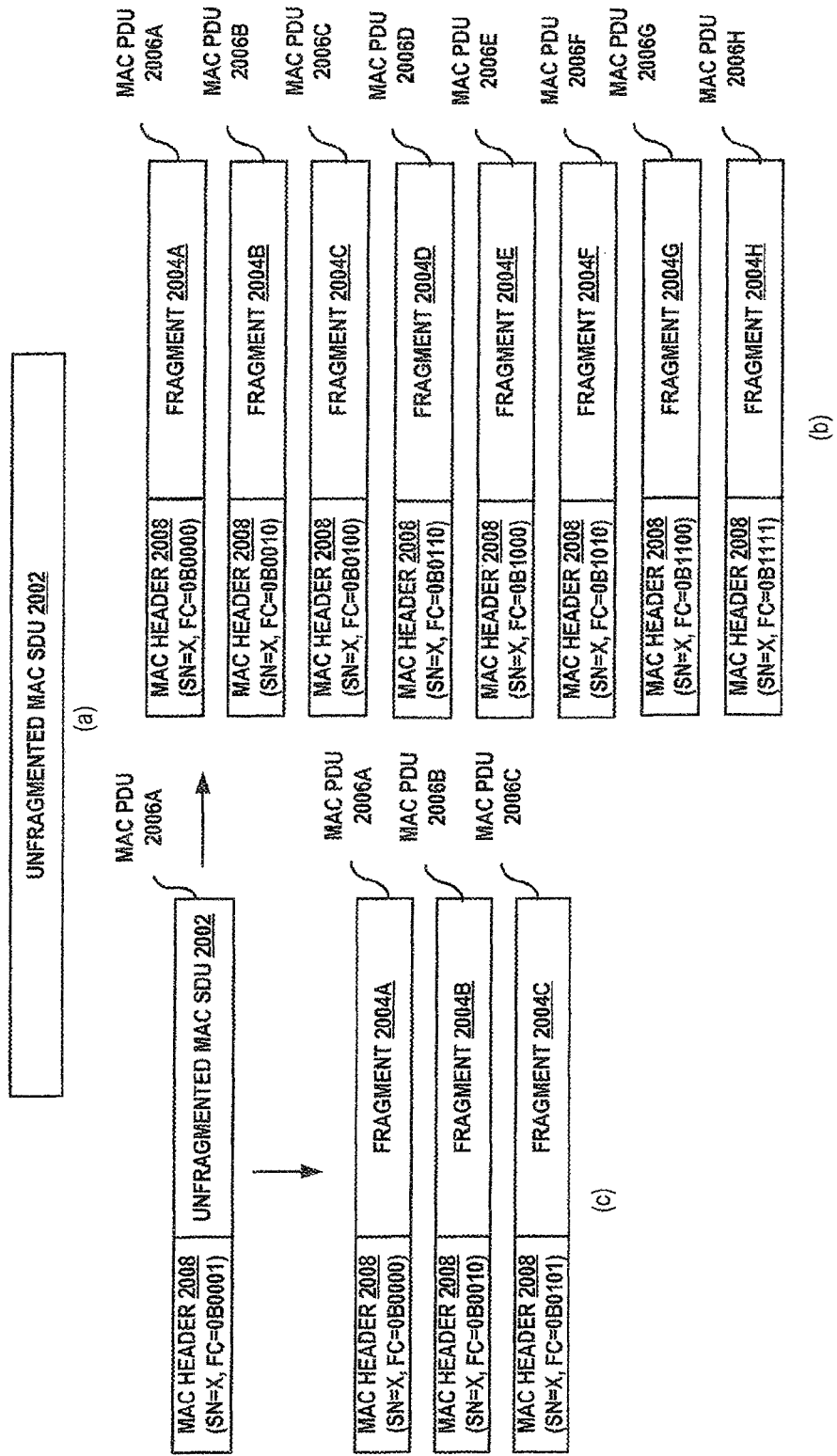
FIG. 20 are schematic representations depicting transmission of a MAC SDU for a non-ARQ connection to the receiving device.

FIG. 20 is schematic representations depicting transmission of a MAC SDU 2002 for a non-ARQ connection to the receiving device 104. Particularly, the schematic representations depict scenarios when a FDU is a MAC SDU 2002 for a non-ARQ connection. FIG. 20(a) illustrates a scenario in which the unfragmented MAC SDU 2002 is transmitted in a MAC PDU 2006A using 'n−1' MSBs and LSBs in FC field. The value zero in the 'n−1' MSBs and value one in the LSB would indicate that payload of a MAC PDU contains an unfragmented MAC SDU 2002. For example, the FC field is set to a value 0b0001 to indicate that the payload of the MAC PDU 2006 carries the unfragmented MAC SDU 2002.

FIGS. 20(b) and (c) illustrate a scenario in which the MAC SDU 2002 is fragmented into multiple fragments 1804A-N based on resources available for transmission and the fragments 1804A-N of the ARQ block 1806 are transmitted in MAC PDUs 1806A-N. According to the present invention, the ARQ block 1802 is fragmented into maximum of $2^{n-1}$ number of fragments. Each of the $2^{n-1}$ fragments may be of same size of different size.

For the purpose of illustration, consider that number of bits (n) used to represent size of FC field is '4' and sequence number of the MAC SDU 2002 is SN #x. In such case, the MAC SDU 2002 is fragmented into maximum of $2^{n-1}$ fragments (i.e., eight fragments). In FIG. 20(b), the MAC SDU 2002 is fragmented into eight fragments 2004A-H. The fragments 2004A-H are packed in the payload 2010 of the MAC PDUs 2006A-H. The control information for the fragments 2004A-H indicating order of the fragments (i.e., 0b0000, 0b0010, 0b0100, 0b0110, 0b1000, 0b1010, 0b100 and 0b1111) is encoded in the MAC header 2008 of the MAC PDUs 2006A-H. Also, the sequence number 'x' identifying the MAC SDU 2002 to which the fragments 2004A-H belongs is encoded in the MAC header 2008 of the MAC PDUs 2006A-H. It can be seen that LSB for the fragments 2004A-G is set to zero to indicate that these are not last fragment of the MAC SDU 2002. However, LSB for the fragment 2004H is set to 1 to indicate that the fragment 2004H is the last fragment of the MAC SDU 2002. It can also be seen that, value of the 'n−1' MSBs ranges from 0-7 for the $1^{st}$ to $8^{th}$ fragment respectively.

In FIG. 20(c), the MAC SDU 2002 is fragmented into three fragments 2004A-H which is less than value $2^{n-1}$ (i.e., eight fragments). The fragments 2004A-C are packed in the payload 2010 of the MAC PDUs 2006A-C. The control information for the fragments 2004A-C indicating order of the fragments (i.e., 0b0000, 0b0010, 0b0101) is encoded in the MAC header 2008 of the MAC PDUs 2006A-C. Also, the sequence number 'x' identifying the MAC SDU 2002 to which the fragments 2004A-C belongs is encoded in the MAC header 2008 of the MAC PDUs 2006A-C. It can be seen that LSB for the fragments 2004A and 2004B is set to zero to indicate that these are not last fragment of the MAC SDU 2002. However, LSB for the fragment 2004C is set to 1 since the fragment 2004C is the last fragment of the MAC SDU 2002.

Figure 21:
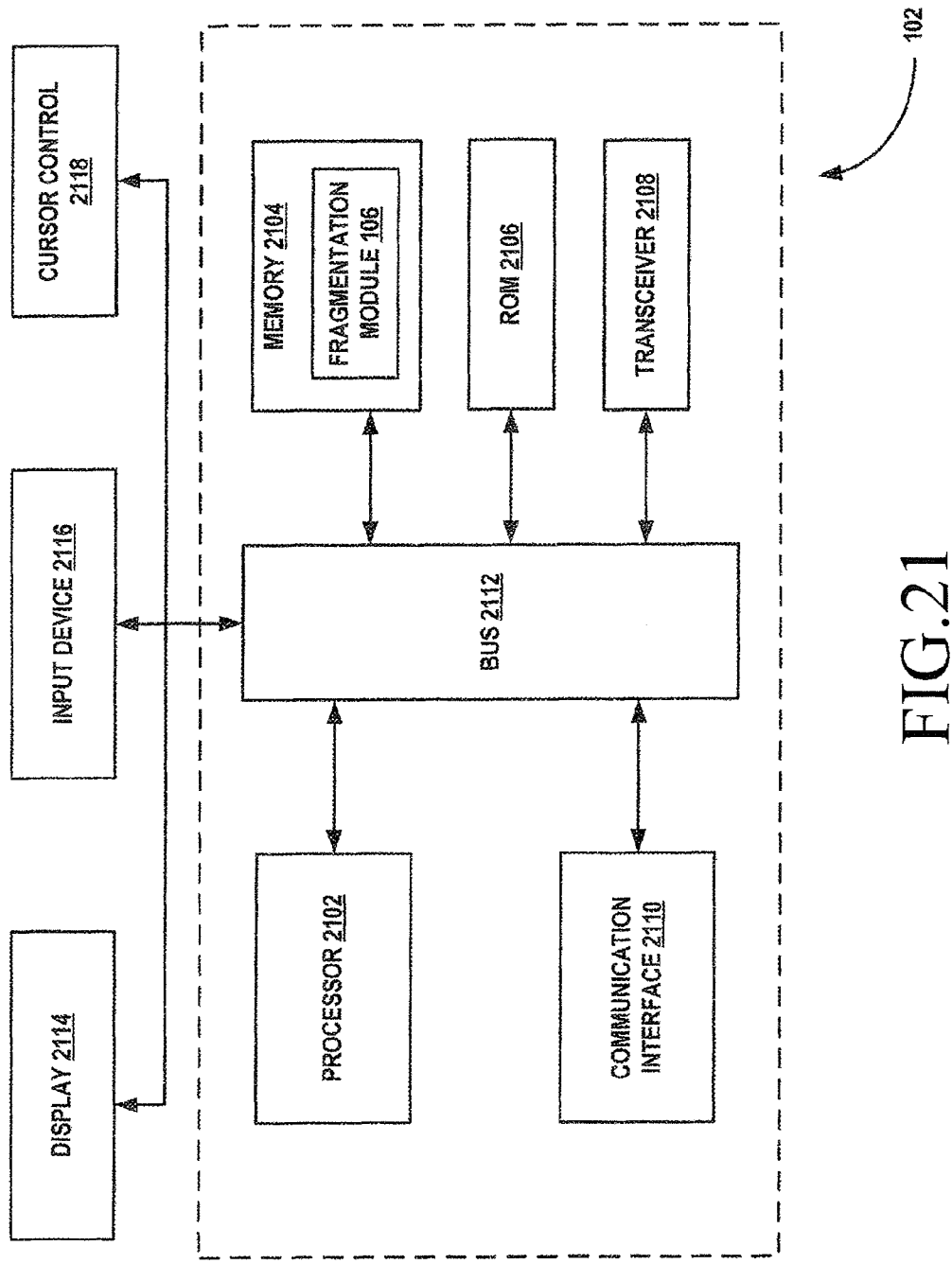
FIG. 21 is a block diagram of an exemplary transmitting device showing various components for implementing embodiments of the present subject matter.

FIG. 21 is a block diagram of the transmitting device 102 showing various components for implementing embodiments of the present subject matter. In FIG. 21, the transmitting device 102 includes a processor 2102, memory 2104, a read only memory (ROM) 2106, a transceiver 2108, a bus 2110, a communication interface 2112, a display 2114, an input device 2116, and a cursor control 2118.

The processor 2102, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 2102 may also include embedded controllers, such as generic or programmable logic devices or arrays, application specific integrated circuits, single-chip computers, smart cards, and the like.

The memory 2104 and the ROM 2106 may be volatile memory and non-volatile memory. The memory 2104 includes the fragmentation module 106 for fragmenting a fragmentable data unit (FDU) and transmitting the fragments of the FDU to the receiving device 104, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Embodiments of the present subject matter may be implemented in conjunction with modules, including functions, procedures, data structures, and application programs, for performing tasks, or defining abstract data types or low-level hardware contexts. The fragmentation module 106 may be stored in the form of machine-readable instructions on any of the above-mentioned storage media and may be executable by the processor 2102. For example, a computer program may include machine-readable instructions capable of fragmenting a fragmentable data unit (FDU) and transmitting the fragments of the FDU to the receiving device 104, according to the teachings and herein described embodiments of the present subject matter. In one embodiment, the program may be included on a compact disk-read only memory (CD-ROM) and loaded from the CD-ROM to a hard drive in the non-volatile memory.

The transceiver 2108 may be capable of transmitting the fragments of the FDU in MAC PDUs to the receiving device 104. The bus 2110 acts as interconnect between various components of the transmitting device 102. The components such as communication interface 2112, the display 2114, the input device 2116, and the cursor control 2118 are well known to the person skilled in the art and hence the explanation is thereof omitted.

Figure 22:
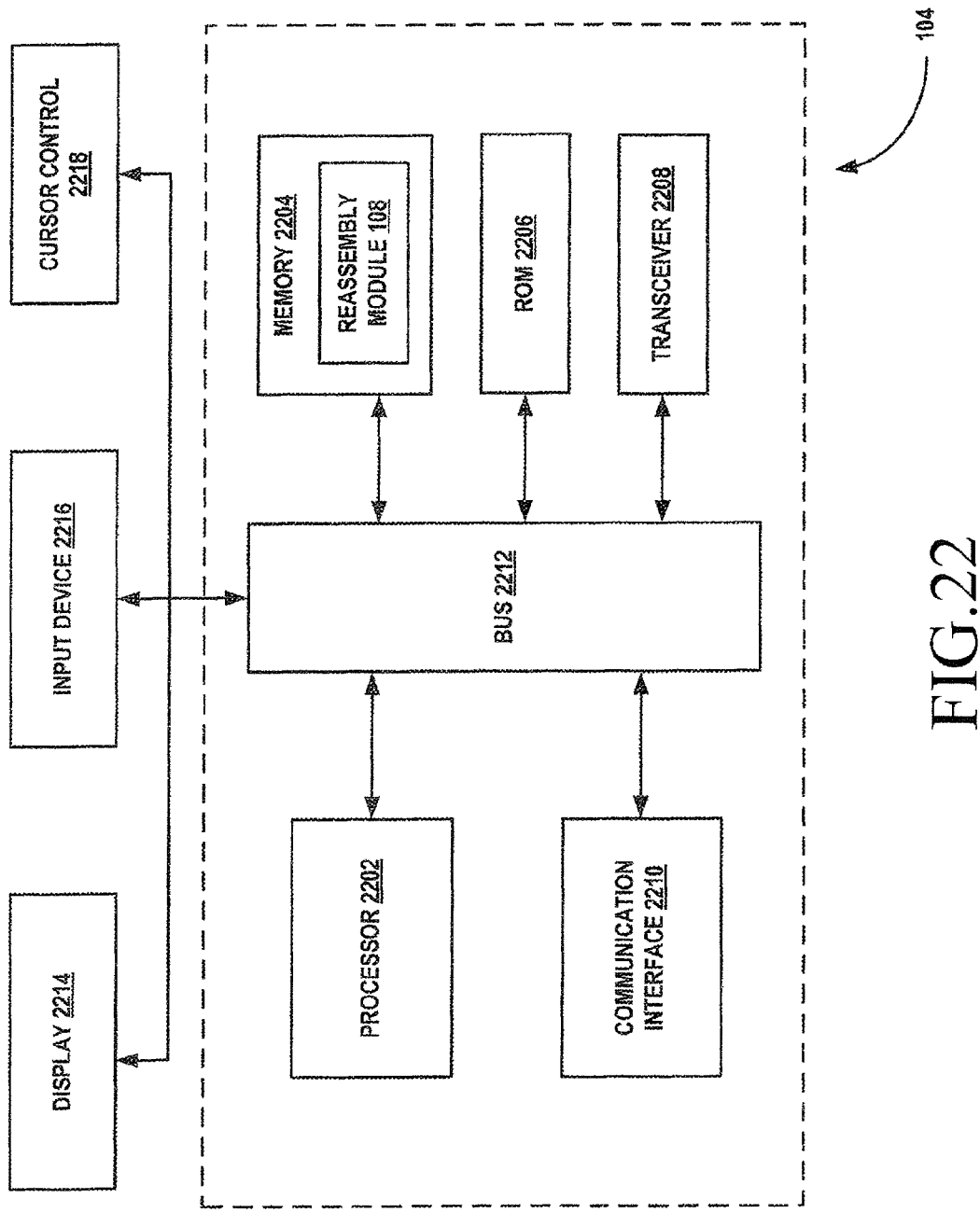
FIG. 22 is a block diagram of an exemplary receiving device showing various components for implementing embodiments of the present subject matter.

FIG. 22 is a block diagram of the receiving device 104 showing various components for implementing embodiments of the present subject matter. In FIG. 22, the receiving device 104 includes a processor 2202, memory 2204, a read only memory (ROM) 2206, a transceiver 2208, a bus 2210, a communication interface 2212, a display 2214, an input device 2216, and a cursor control 2218.

The processor 2202, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 2202 may also include embedded controllers, such as generic or programmable logic devices or arrays, application specific integrated circuits, single-chip computers, smart cards, and the like.

The memory 2204 and the ROM 2206 may be volatile memory and non-volatile memory. The memory 2204 includes the reassembly module 108 for forming a fragmentable data unit (FDU) from fragments of the FDU received in MAC PDUs from the transmitting device 102, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Embodiments of the present subject matter may be implemented in conjunction with modules, including functions, procedures, data structures, and application programs, for performing tasks, or defining abstract data types or low-level hardware contexts. The reassembly module 108 may be stored in the form of machine-readable instructions on any of the above-mentioned storage media and may be executable by the processor 2202. For example, a computer program may include machine-readable instructions capable of forming a fragmentable data unit (FDU) from fragments of the FDU received in MAC PDUs from the transmitting device 102, according to the teachings and herein described embodiments of the present subject matter. In one embodiment, the computer program may be included on a compact disk-read only memory (CD-ROM) and loaded from the CD-ROM to a hard drive in the non-volatile memory.

The transceiver 2208 may be capable of receiving the fragments of the FDU in MAC PDUs from the transmitting device 102. The bus 2210 acts as interconnect between various components of the receiving device 104. The components such as communication interface 2212, the display 2214, the input device 2216, and the cursor control 2218 are well known to the person skilled in the art and hence the explanation is thereof omitted.

The present embodiments have been described with reference to specific example embodiments; it will be evident that various modifications and changes may be made to these embodiments without departing from the broader spirit and scope of the various embodiments. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method of transmitting fragmentable data units (FDUs) in a wireless communication environment, comprising:
    fragmenting a FDU into a fixed number of fragments by a transmitting device;
    packing the fragments of the FDU in payloads of Medium Access Control (MAC) Protocol Data Units (PDUs);
    encoding control information associated with each of the fragments in a fragmentation control (FC) field and a sequence number (SN) field of the respective MAC PDUs, wherein the control information encoded in the FC field indicates position of the each of the fragments with respect to other fragments of the FDU, and wherein the control information encoded in the SN field identifies the FDU to which the each of the fragments belongs; and
    transmitting the MAC PDUs containing the fragments of the FDU and the control information associated with each of the fragments to a receiving device.

2. The method of claim 1, wherein fragmenting the FDU into the fixed number of fragments comprises:
    fragmenting each FDU into ($2^n-1$) number of fragments, where 'n' is equal to the number of bits used to represent the FC field.

3. The method of claim 1, wherein the fragments of the FDU are fixed or variable size.

4. The method of claim 1, wherein packing the fragments of the FDU in the payloads of the MAC PDUs comprises:
    packing each of the fragments of the FDU in a payload of different MAC PDUs.

5. The method of claim 1, wherein in encoding the control information in the FC field of the respective MAC PDUs, value zero in the FC field indicates that the payload of the respective MAC PDU contains an unfragmented FDU and a non zero value X in the FC field indicates that the payload of the respective MAC PDU contains the $X^{th}$ fragment of the FDU, where X is an integer ranging from 1 to ($2^n-1$).

6. The method of claim 1, wherein the FDU comprises a MAC Service Data Unit (SDU).

7. The method of claim 1, wherein the FDU comprises an Automatic Repeat Request (ARQ) block.

8. A transmitting device comprising:
    a processor; and
    memory coupled to the processor, wherein the memory includes a fragmentation module configured to:
        fragment a fragmentable data unit (FDU) into a fixed number of fragments;
        pack the fragments of the FDU in payloads of Medium Access Control (MAC) Protocol Data Units (PDUs);
        encode control information associated with each of the fragments in a fragmentation control (FC) field and a sequence number (SN) field of the respective MAC PDUs, wherein the control information encoded in the FC field indicates position of the each of the fragments with respect to other fragments of the FDU, and wherein the control information encoded in the SN field identifies the FDU to which the each of the fragments belongs; and
        transmit the MAC PDUs containing the fragments of the FDU and the control information associated with each of the fragments to a receiving device.

9. The transmitting device of claim 8, wherein the fragmentation module is configured to fragment each FDU into ($2^n-1$) number of fragments, where 'n' is equal to the number of bits used to represent the FC field.

10. The transmitting device of claim 8, wherein value zero in the FC field indicates that the payload of the respective MAC PDU contains an unfragmented FDU and a non zero value X in the FC field indicates that the payload of the respective MAC PDU contains the $X^{th}$ fragment of the FDU, where X is an integer ranging from 1 to ($2^n-1$).

11. The transmitting device of claim 8, wherein the FDU comprises a MAC Service Data Unit (SDU).

12. The transmitting device of claim 8, wherein the FDU comprises an Automatic Repeat Request (ARQ) block.

13. A method of forming a fragmentable data unit (FDU) from fragments of the FDU received from a transmitting device, comprising:
receiving Medium Access Control (MAC) Protocol Data Units (PDUs) containing fragments of the FDU and control information associated with the fragments from a transmitting device, wherein the control information in a Fragmentation Control (FC) field of the respective MAC PDUs indicates position of each of the fragments with respect to other fragments of the FDU, and wherein the control information in a Sequence Number (SN) field of the respective MAC PDUs identifies the FDU to which the fragment belongs; and
determining whether a fixed number of fragments are received from the transmitting device based on the control information associated with each of the received fragments; and
generating the FDU from the fixed number of fragments received in the MAC PDUs using the control information associated with each of the received fragments.

14. The method of claim 13, wherein in determining whether the fixed number of fragments are received from the transmitting device based on the control information associated with each of the received fragments, the fixed number of fragments is equal to $(2^n-1)$, where 'n' is equal to the number of bits used to represent the FC field.

15. A receiving device comprising:
a processor; and
memory coupled to the processor, wherein the memory includes a reassembly module configured to:
receive Medium Access Control (MAC) Protocol Data Units (PDUs) containing fragments of a fragmentable data unit (FDU) and control information associated with the fragments from a transmitting device, wherein the control information in a Fragmentation Control (FC) field of the respective MAC PDUs indicates position of each of the fragments with respect to other fragments of the FDU, and wherein the control information in a Sequence Number (SN) field of the respective MAC PDUs identifies the FDU to which the fragment belongs;
determine whether a fixed number of fragments are received from the transmitting device based on the control information associated with each of the received fragments; and
generate the FDU from the fixed number of fragments received in the MAC PDUs using the control information associated with each of the received fragments.

16. The receiving device of claim 15, wherein the fixed number of fragments is equal to $(2^n-1)$, where 'n' is equal to the number of bits used to represent the FC field.

17. A method of transmitting fragmentable data unit (FDUs) in a wireless communication environment, comprising:
fragmenting a FDU into two or more fragments by a transmitting device, wherein total number of fragments is equal to or less than a threshold value;
packing the fragments of the FDU in payloads of Medium Access Control (MAC) Protocol Data Units (PDUs);
encoding control information associated with each of the fragments in a fragmentation control (FC) field and a sequence number (SN) field of the respective MAC PDUs, wherein the control information encoded in the FC field indicates position of the each of the fragments with respect to other fragments of the FDU, and wherein the control information encoded in the SN field identifies the FDU to which the each of the fragments belongs; and
transmitting the MAC PDUs containing the fragments of the FDU and the control information associated with each of the fragments to a receiving device.

18. The method of claim 17, wherein the fragments of the FDU are fixed or variable size.

19. The method of claim 17, wherein packing the fragments of the FDU in the payloads of the MAC PDUs comprises:
packing each of the fragments of the FDU in payload of different MAC PDUs.

20. The method of claim 17, the threshold value is equal to $(2^n-1)$, where 'n' is equal to the number of bits used to represent the FC field.

21. The method of claim 20, wherein in encoding the control information in the FC field of the respective MAC PDUs, value zero in the FC field indicates that the payload of the respective MAC PDUs contains an unfragmented FDU and a non zero value X in the FC field indicates that the payload of the respective MAC PDUs contains the $X^{th}$ fragment of the FDU, where X is an integer ranging from 1 to $(2^n-1)$.

22. The method of claim 20, wherein encoding the control information of each fragment of the FDU in the FC field and the SN field of the respective MAC PDU comprises:
determining whether total number of fragments formed from the FDU is equal to the threshold value;
if so, encoding a value equal to $(2^n-1)$ in the FC field associated with the MAC PDU carrying the last fragment of the FDU; and
if not, transmitting a MAC PDU with only MAC header substantially following the MAC PDU carrying the last fragment of the FDU, wherein the MAC header includes control information identical to the control information encoded in the FC field and the SN field of the MAC PDU carrying the last fragment of the FDU.

23. The method of claim 20, wherein encoding the control information of each fragment of the FDU in the FC field and the SN field of the respective MAC PDU comprises:
determining whether total number of fragments formed from the FDU is equal to the threshold value;
if so, encoding a value equal to $(2^n-1)$ in the FC field associated with the MAC PDU carrying the last fragment of the FDU; and
if not, transmitting a MAC PDU with only MAC header substantially following the MAC PDU carrying the last fragment of the FDU, wherein the MAC header contains a FC field having value equal to $(2^n-1)$ and a SN field having sequence number encoded in the SN field associated with MAC PDU carrying the last fragment of the FDU.

24. The method of claim 17, wherein the threshold value is equal to $(2^{n-1})$, where 'n' is equal to number of bits used to represent the FC field.

25. The method of claim 24, wherein the 'n' bits of FC field includes 'n-1' Most Significant Bits (MSBs) and a Least Significant Bit (LSB) indicating order and type of the fragments of the FDU respectively.

26. The method of claim 25, wherein in encoding the control information in the FC field of the respective MACPDUs, value zero in the 'n-1' MSBs and value one in the LSB indicates that the payload of the MAC PDU contains one or more unfragmented FDUs.

27. The method of claim 25, wherein in encoding control information in the FC field of the respective MAC PDUs, value X in the 'n−1' MSBs and value zero in the LSB indicates the payload of the respective MAC PDUs contains $X+1^{th}$ fragment of the FDU, where X is an integer ranging from 0 to $(2^{n-1}-2)$ and $X+1^{th}$ fragment is not the last fragment of the FDU.

28. The method of claim 25, wherein in encoding control information in the FC field of the respective MAC PDUs, value X in the 'n−1' MSBs and value one in the LSB indicates the payload of the respective MAC PDUs contains $X+1^{th}$ fragment of the FDU, where X is an integer ranging from 0 to $(2^{n-1}-1)$ and $X+1^{th}$ fragment is the last fragment of the FDU.

29. The method of claim 17, wherein the FDU comprises a MAC Service Data Unit (SDU).

30. The method of claim 17, wherein the FDU comprises an Automatic Repeat Request (ARQ) block.

31. A transmitting device comprising:
   a processor; and
   memory coupled to the processor, wherein the memory includes a fragmentation module configured to:
      fragment a fragmentable data unit (FDU) into two or more fragments, wherein total number of fragments is equal to or less than a threshold value;
      pack the fragments of the FDU in payloads of Medium Access Control (MAC) Protocol Data Units (PDUs);
      encode control information associated with each of the fragments in a fragmentation control (FC) field and a sequence number (SN) field of the respective MAC PDUs, wherein the control information encoded in the FC field indicates position of the each of the fragments with respect to other fragments of the FDU, and wherein the control information encoded in the SN field identifies the FDU to which the each of the fragments belongs; and
      transmit the MAC PDUs containing the fragments of the FDU and the control information associated with each of the fragments to a receiving device.

32. The transmitting device of claim 31, the threshold value is equal to $(2^n-1)$, where 'n' is equal to the number of bits used to represent the FC field.

33. The transmitting device of claim 32, wherein value zero in the FC field indicates that the payload of the respective MAC PDUs contains an unfragmented FDU and a non zero value X in the FC field indicates that the payload of the respective MAC PDUs contains the $X^{th}$ fragment of the FDU, where X is an integer ranging from 1 to $(2^n-1)$.

34. The transmitting device of claim 32, wherein in encoding the control information of each fragment of the FDU in the FC field and the SN field of the respective MAC PDU, the fragmentation module is configured to:
   determine whether total number of fragments formed from the FDU is equal to the threshold value;
   if so, encode a value equal to $(2^n-1)$ in the FC field associated with the MAC PDU carrying the last fragment of the FDU; and
   if not, transmit a MAC PDU with only MAC header substantially following the MAC PDU carrying the last fragment of the FDU, wherein the MAC header includes control information identical to the control information encoded in the FC field and the SN field of the MAC PDU carrying the last fragment of the FDU.

35. The transmitting device of claim 32, wherein in encoding the control information of each fragment of the FDU in the FC field and the SN field of the respective MAC PDU, the fragmentation module is configured to:
   determine whether total number of fragments formed from the FDU is equal to the threshold value;
   if so, encode a value equal to $(2^n-1)$ in the FC field associated with the MAC PDU carrying the last fragment of the FDU; and
   if not, transmit a MAC PDU with only MAC header substantially following the MAC PDU carrying the last fragment of the FDU, wherein the MAC header contains a FC field having value equal to $(2^n-1)$ and a SN field having sequence number encoded in the SN field associated with MAC PDU carrying the last fragment of the FDU.

36. The transmitting device of claim 31, wherein the threshold value is equal to $(2^{n-1})$, where 'n' is equal to number of bits used to represent the FC field.

37. The transmitting device of claim 36, wherein the 'n' bits of FC field includes 'n−1' Most Significant Bits (MSBs) and a Least Significant Bit (LSB) indicating order and type of the fragments of the FDU respectively.

38. The transmitting device of claim 36, wherein value zero in the 'n−1' MSBs and value one in the LSB indicates that the payload of the MAC PDU contains one or more unfragmented FDUs.

39. The transmitting device of claim 36, wherein value X in the 'n−1' MSBs and value zero in the LSB indicates the payload of the respective MAC PDUs contains $X+1^{th}$ fragment of the FDU, where X is an integer ranging from 0 to $(2^{n-1}-2)$ and $X+1^{th}$ fragment is not the last fragment of the FDU.

40. The transmitting device of claim 36, wherein value X in the 'n−1' MSBs and value one in the LSB indicates the payload of the respective MAC PDUs contains $X+1^{th}$ fragment of the FDU, where X is an integer ranging from 0 to $(2^{n-1}-1)$ and $X+1^{th}$ fragment is the last fragment of the FDU.

41. The transmitting device of claim 31, wherein the FDU comprises a MAC Service Data Unit (SDU).

42. The transmitting device of claim 31, wherein the FDU comprises an Automatic Repeat Request (ARQ) block.

43. A method of forming a fragmentable data unit (FDU) from fragments of the FDU received from a transmitting device, comprising:
   receiving Medium Access Control (MAC) Protocol Data Units (PDUs) containing fragments of the FDU and control information associated with the fragments from a transmitting device, wherein the control information in a Fragmentation Control (FC) field of the respective MAC PDUs indicates position of each of the fragments with respect to other fragments of the FDU, and wherein the control information in a Sequence Number (SN) field of the respective MAC PDUs identifies the FDU to which the fragment belongs;
   determining whether an entire set of fragments of the FDU are received from the transmitting device based on the control information associated with each of the received fragments; and
   generating the FDU from the entire set of fragments received in the MAC PDUs using control information associated with each of the received fragments.

44. The method of claim 43, wherein the entire set of fragments comprises maximum of $(2^n-1)$ fragments, where 'n' is equal to the number of bits used to represent the FC field.

45. The method of claim 44, wherein determining whether the entire set of fragments of the FDU are received from the transmitting device based on the control information associated with each of the received fragments comprises:
  receiving a MAC PDU with only MAC header; and
  determining whether the number of fragments is equal to value in the FC field decoded from the MAC header of the MAC PDU with only MAC header.

46. The method of claim 44, wherein determining whether the entire set of fragments of the FDU are received from the transmitting device based on the control information associated with each of the received fragments comprises:
  receiving a MAC PDU with only MAC header; and
  determining whether number of fragments of the FDU is equal to value of the FC field in the MAC header of the MAC PDU carrying fragment of the FDU received prior to receiving the MAC PDU with only MAC header for the FDU.

47. The method of claim 43, wherein the entire set of fragments comprises maximum of $(2^{n-1})$ fragments, where 'n' is equal to the number of bits used to represent the FC field.

48. The method of claim 47, wherein determining whether the entire set of fragments of the FDU are received from the transmitting device based on the control information associated with each of the received fragments comprises:
  determining whether the entire set of fragments of the FDU are received from the transmitting device based on value of 'n−1' Most Significant Bits (MSBs) and a Least Significant Bit (LSB) in the FC field of the respective MAC PDUs.

49. A receiving device comprising:
a processor; and
memory coupled to the processor, wherein the memory includes a reassembly module configured to:
  receive Medium Access Control (MAC) Protocol Data Units (PDUs) containing fragments of a fragmentable data unit (FDU) and control information associated with the fragments from a transmitting device, wherein the control information in a Fragmentation Control (FC) field of the respective MAC PDUs indicates position of each of the fragments with respect to other fragments of the FDU, and wherein the control information in a Sequence Number (SN) field of the respective MAC PDUs identifies the FDU to which the fragment belongs;
  determine whether an entire set of fragments of the FDU are received from the transmitting device based on the control information associated with each of the received fragments; and
  generate the FDU from the entire set of fragments received in the MAC PDUs using control information associated with each of the received fragments.

50. The receiving device of claim 49, wherein the entire set of fragments comprises maximum of $(2^n-1)$ fragments, where 'n' is equal to the number of bits used to represent the FC field.

51. The receiving of claim 49, wherein the entire set of fragments comprises maximum of $(2^{n-1})$ fragments, where 'n' is equal to the number of bits used to represent the FC field.

* * * * *